(12) United States Patent
Miller

(10) Patent No.: US 8,683,952 B2
(45) Date of Patent: Apr. 1, 2014

(54) CAT LITTER BOX SYSTEM

(76) Inventor: Matthew J. Miller, Ponte Vedra Beach, FL (US)

( * ) Notice: Subject to any disclaimer, the term of this patent is extended or adjusted under 35 U.S.C. 154(b) by 241 days.

(21) Appl. No.: 13/117,512

(22) Filed: May 27, 2011

(65) Prior Publication Data

US 2011/0315084 A1 Dec. 29, 2011

Related U.S. Application Data

(60) Provisional application No. 61/433,019, filed on Jan. 14, 2011, provisional application No. 61/348,803, filed on May 27, 2010.

(51) Int. Cl.
*A01K 1/035* (2006.01)

(52) U.S. Cl.
USPC .......................................... 119/166; 119/165

(58) Field of Classification Search
USPC .......................... 119/161, 163, 165, 166, 168
See application file for complete search history.

(56) References Cited

U.S. PATENT DOCUMENTS

| | | | | | |
|---|---|---|---|---|---|
| 3,621,817 | A | * | 11/1971 | Printz | 119/163 |
| 5,267,530 | A | * | 12/1993 | Zamoyski | 119/166 |
| 5,622,140 | A | * | 4/1997 | McIlnay-Moe | 119/166 |
| 5,785,000 | A | * | 7/1998 | Barbary | 119/166 |
| 6,202,595 | B1 | * | 3/2001 | Atcravi | 119/165 |
| 6,205,954 | B1 | * | 3/2001 | Bogaerts | 119/166 |
| 6,588,369 | B2 | * | 7/2003 | Carlisi | 119/166 |
| 6,701,868 | B1 | * | 3/2004 | Shepherd | 119/166 |
| 6,997,137 | B1 | * | 2/2006 | Ricke | 119/168 |
| 2009/0241850 | A1 | * | 10/2009 | Campbell et al. | 119/164 |

* cited by examiner

*Primary Examiner* — Rob Swiatek
*Assistant Examiner* — Kathleen Alker
(74) *Attorney, Agent, or Firm* — Amster, Rothstein & Ebenstein LLP

(57) ABSTRACT

An automated cat litter box includes a cat litter tray, a cat litter return bin that collects soiled cat litter from the cat litter tray and that returns recycled cat litter to the cat litter tray, a control unit, and one or more drive units operated by the control unit to drive the cat litter tray and the cat litter return tray to automatically recycle the soiled cat litter during a cat litter box cleaning cycle.

22 Claims, 33 Drawing Sheets

FIGURE 5

Network Time 12:00: Box A and Box B are vacant, no timers running.

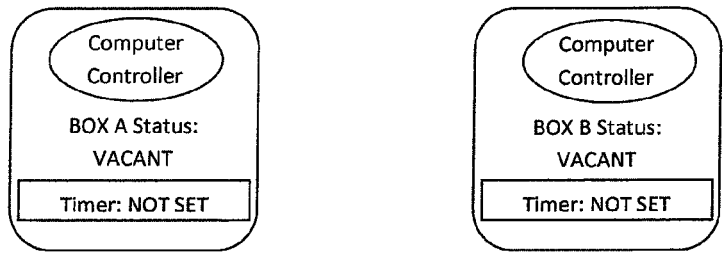

Network Time 12:01: Animal enters Box A, triggers sensor, cleaning cycle timer set to 8 minutes. Message sent to Box B, but no action is required by Box B at this time.

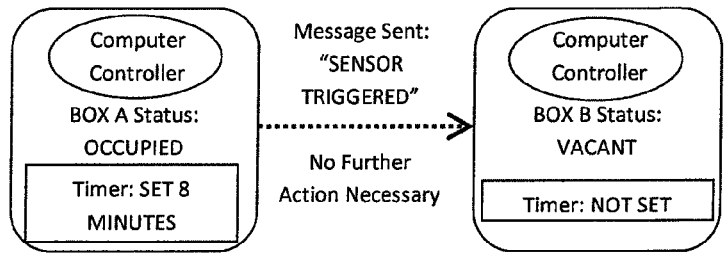

Network Time 12:08: Box A is vacant, and timer expires in 1 minute. Animal enters Box B, triggers sensor. Message sent from Box B to Box A. Box A timer reset to 3 minutes (additional 2-minute delay)

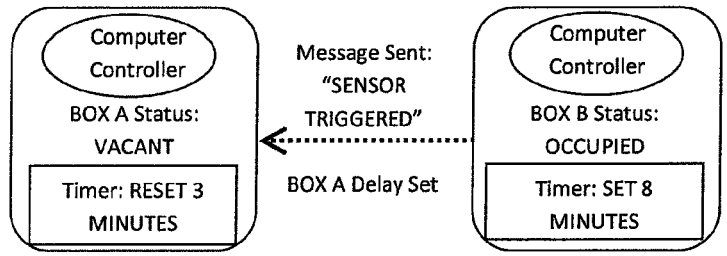

Network Time 12:11: Box A and Box B are vacant. Box A timer expired and cleaning cycle initiated. Box B timer still has 5 minutes remaining.

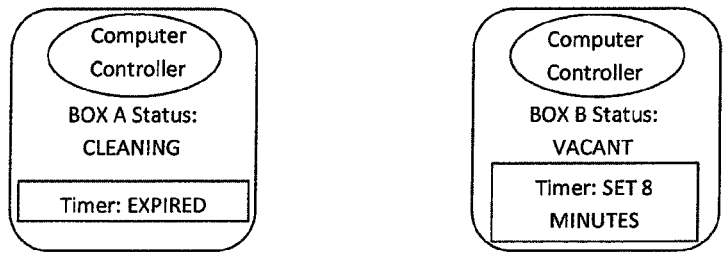

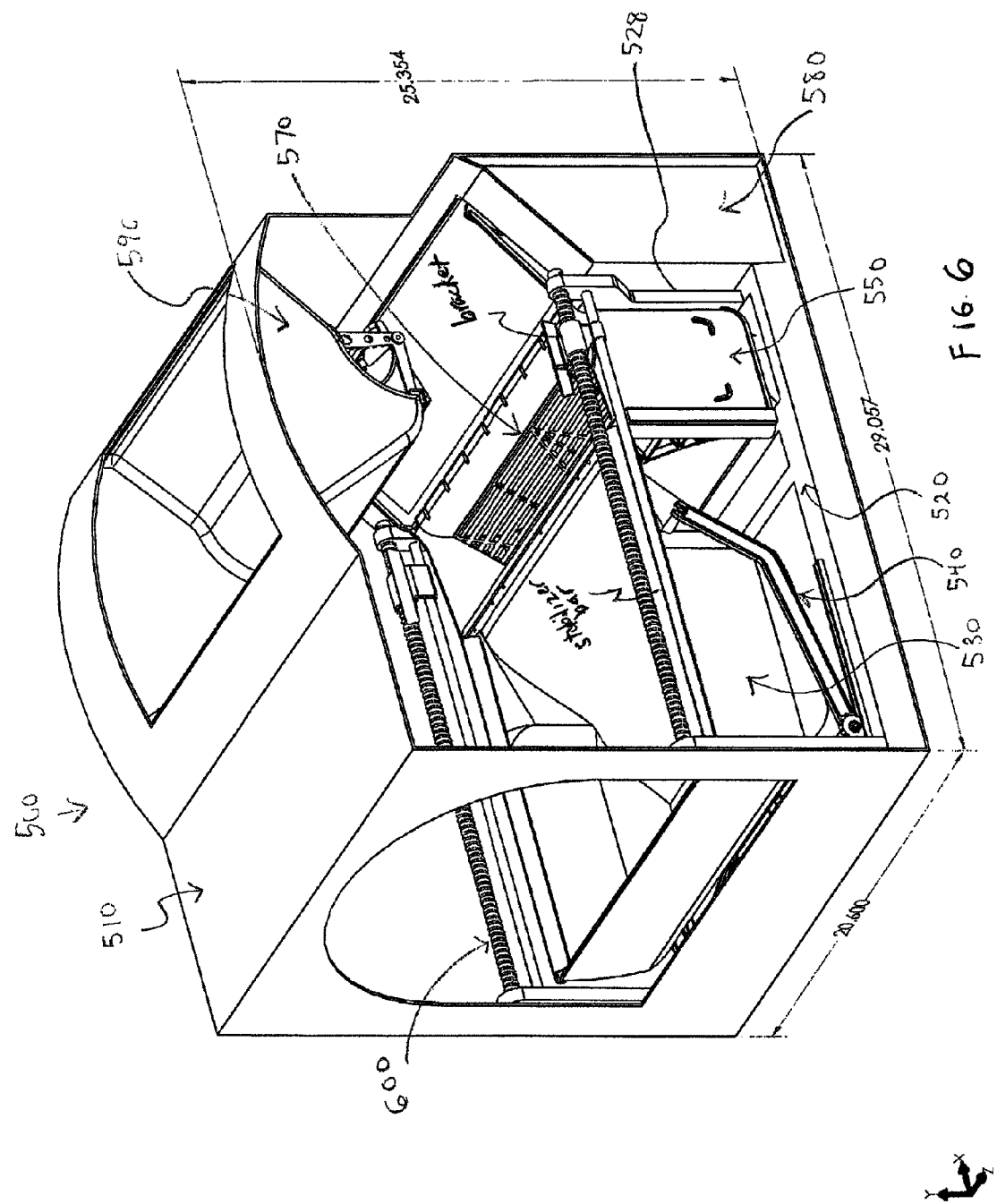

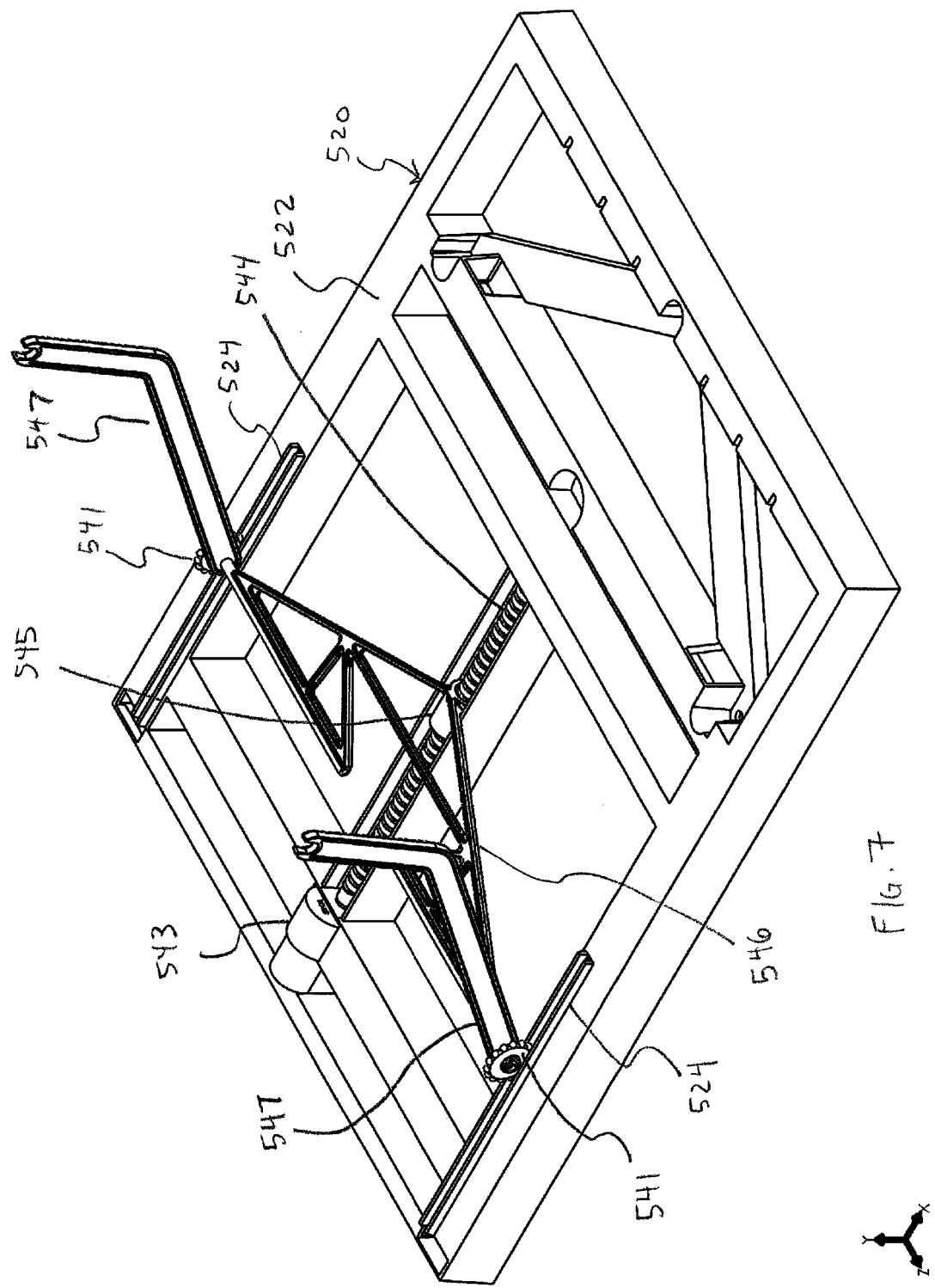

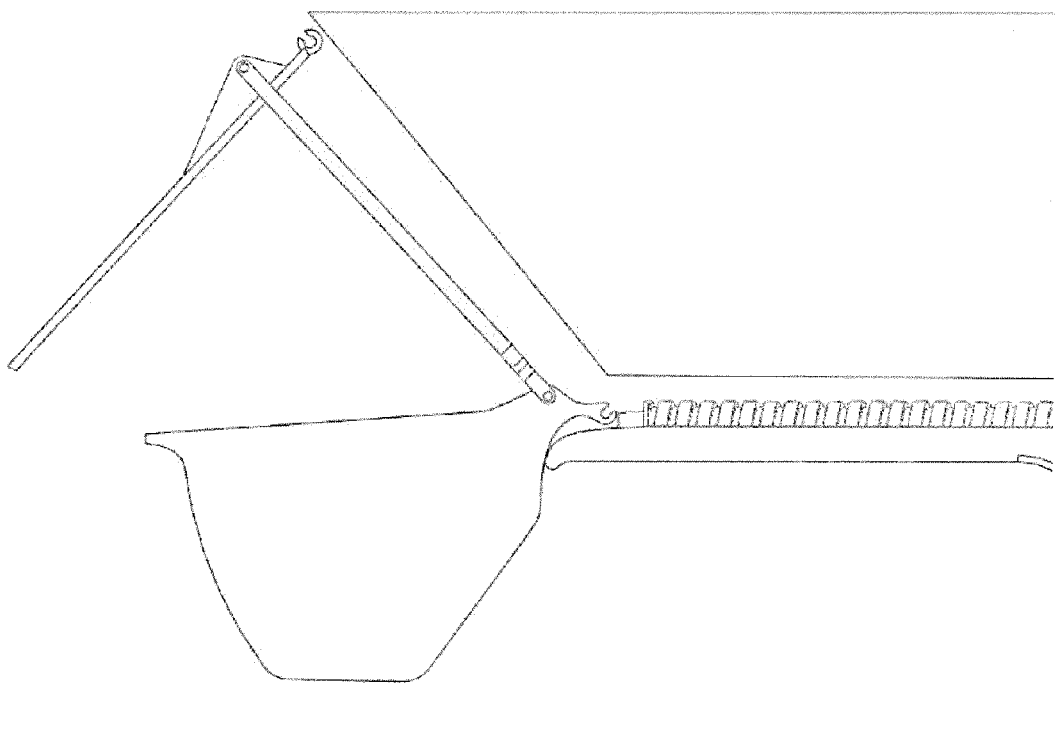
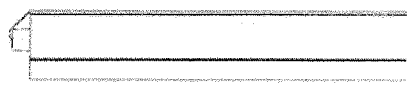
FIGURE 12

STEP 4

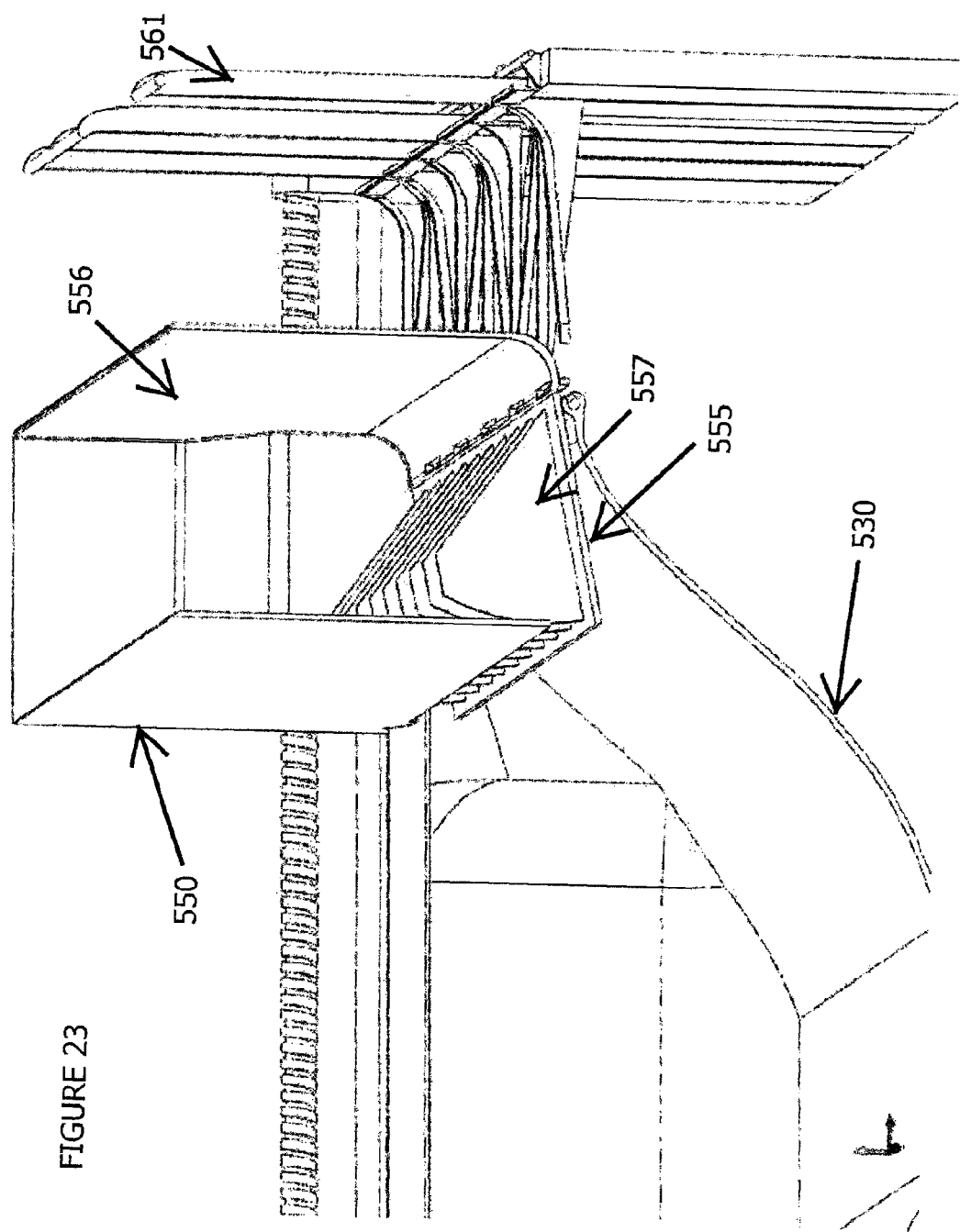

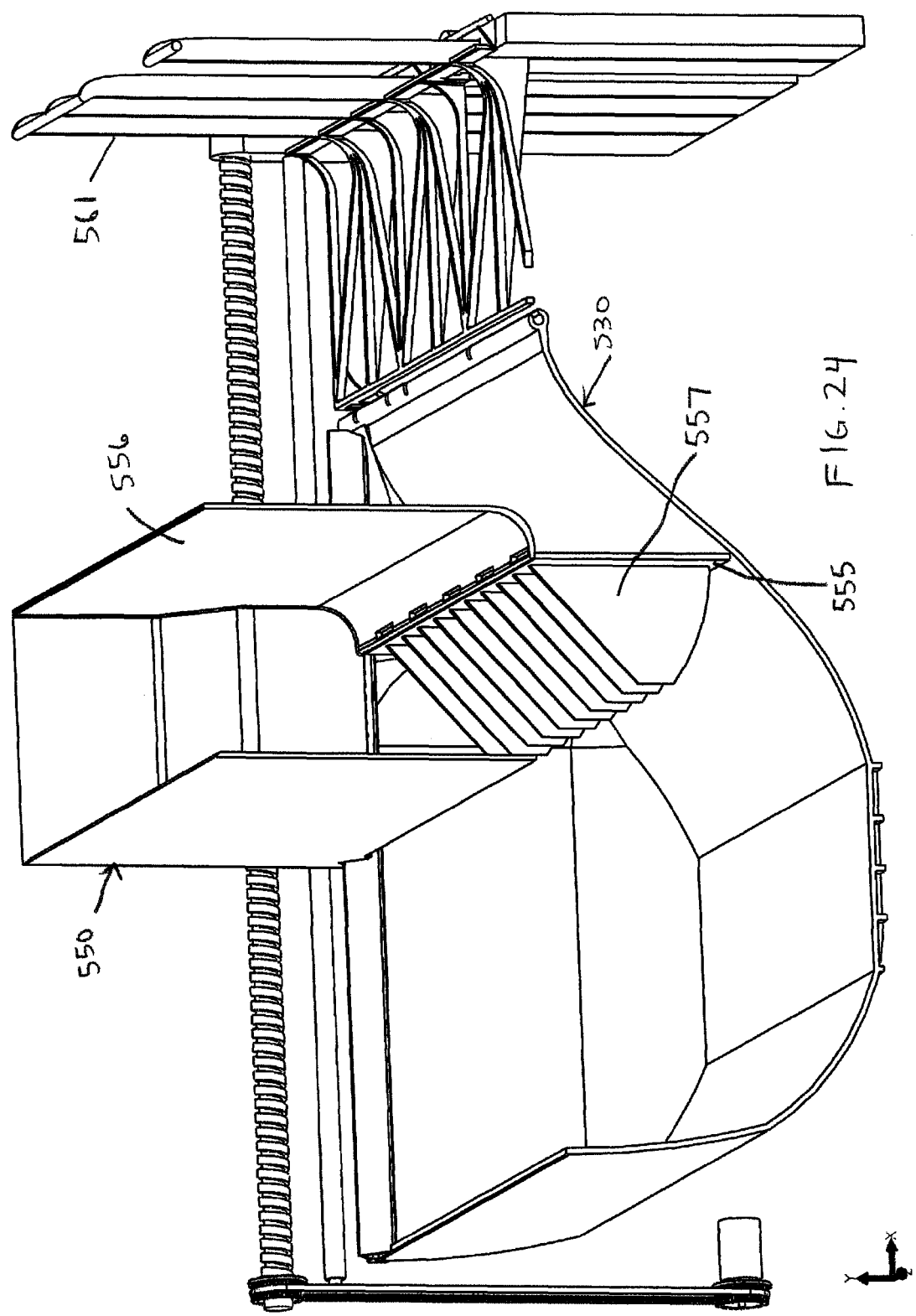

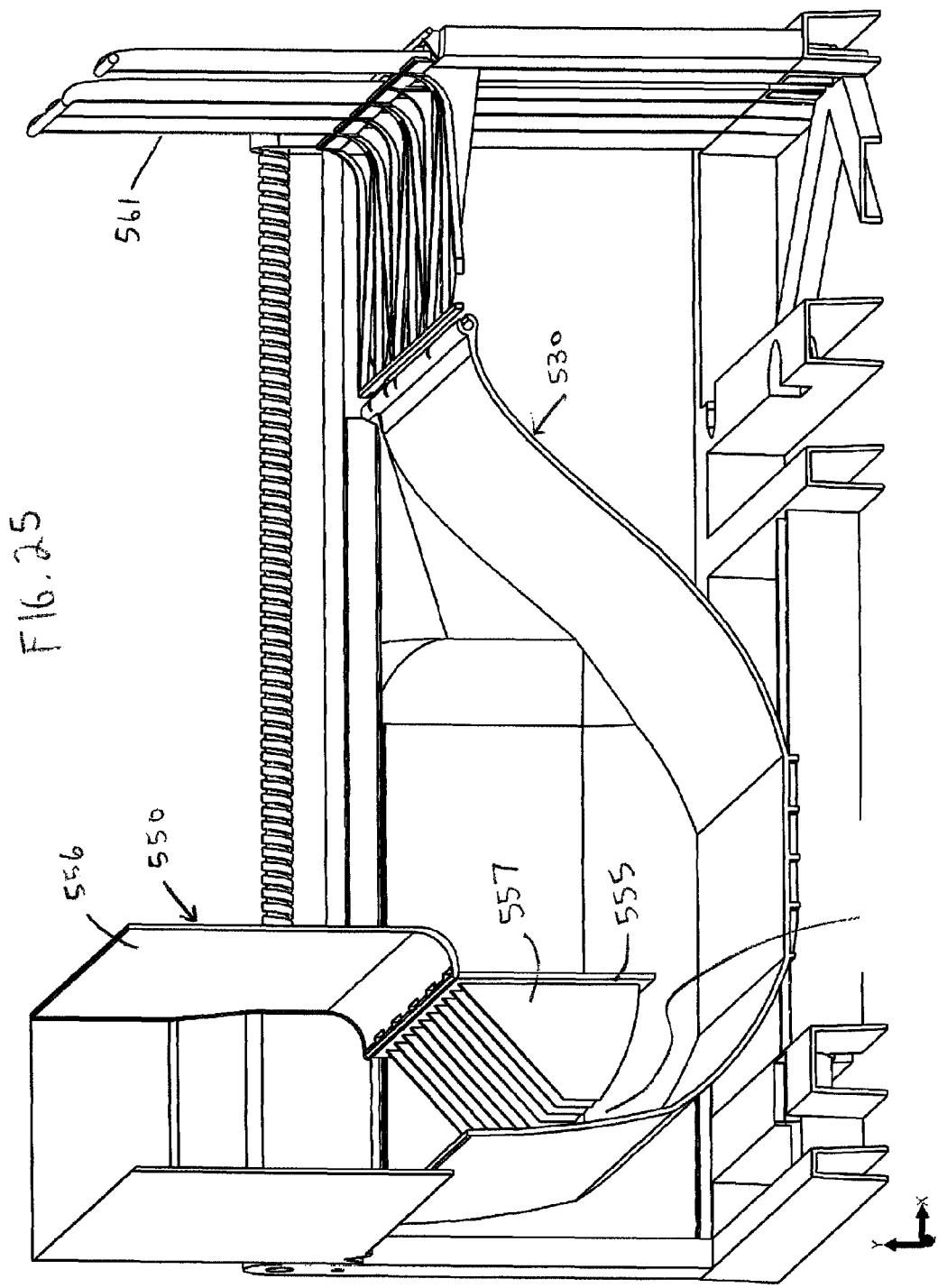

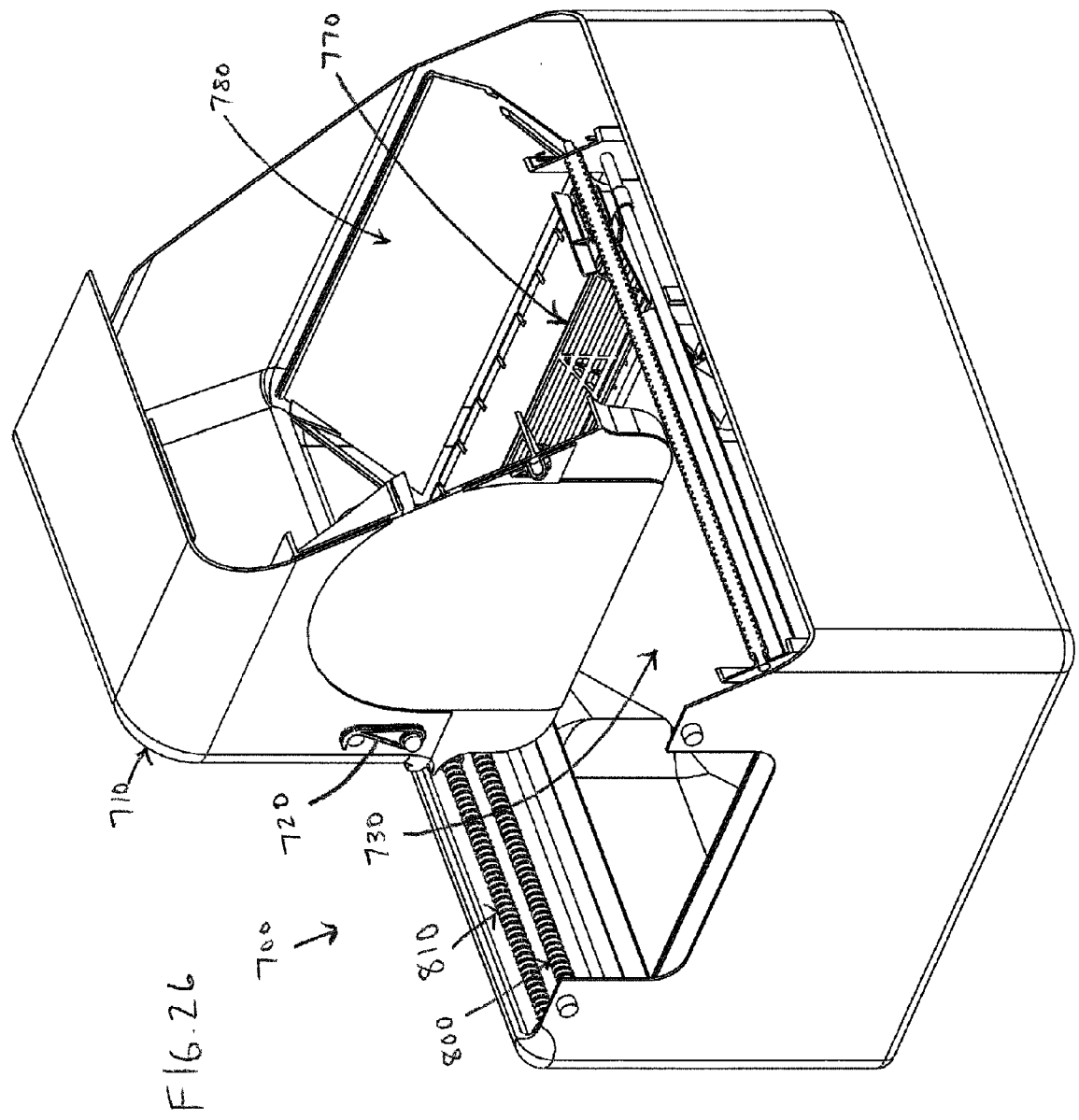

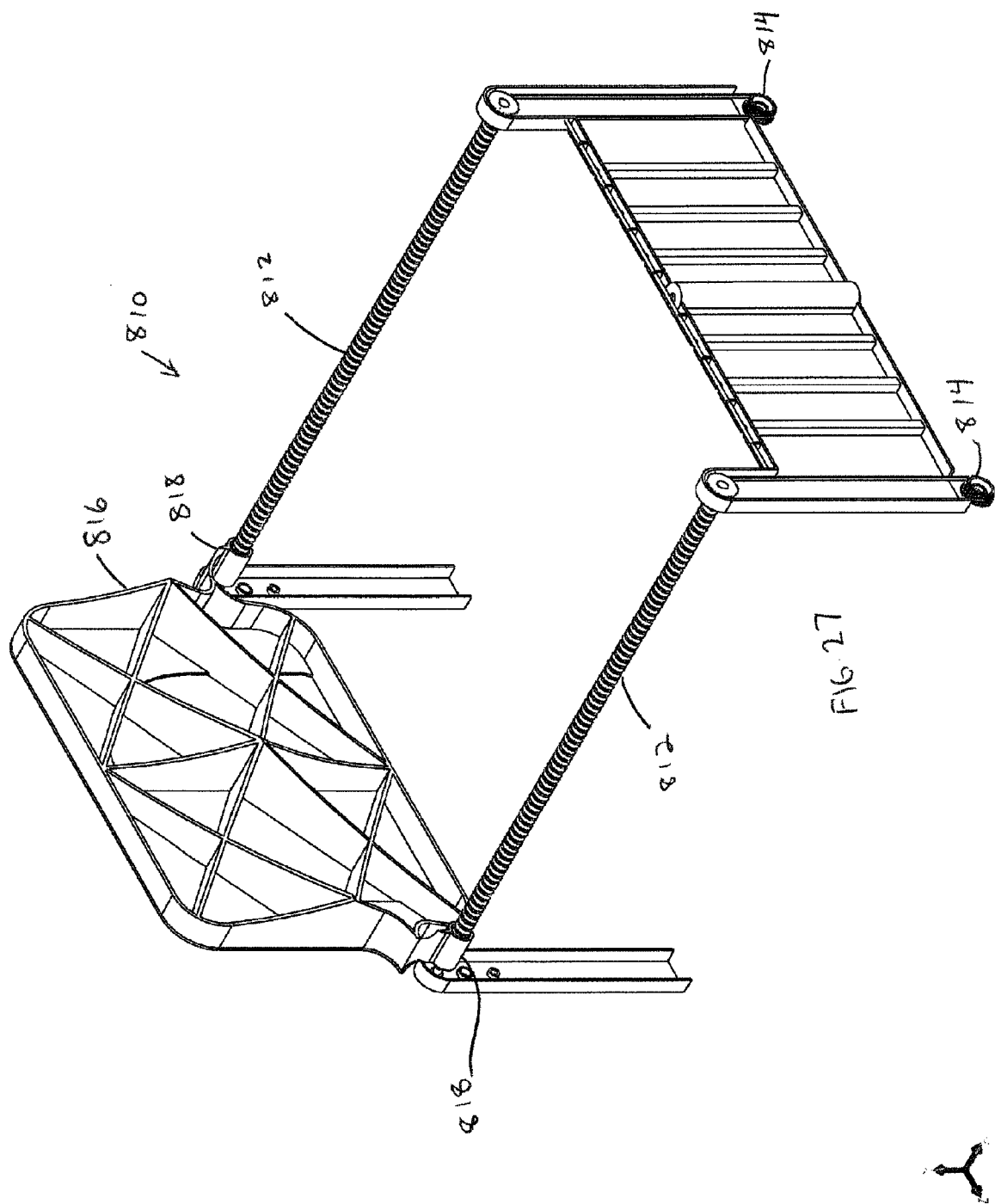

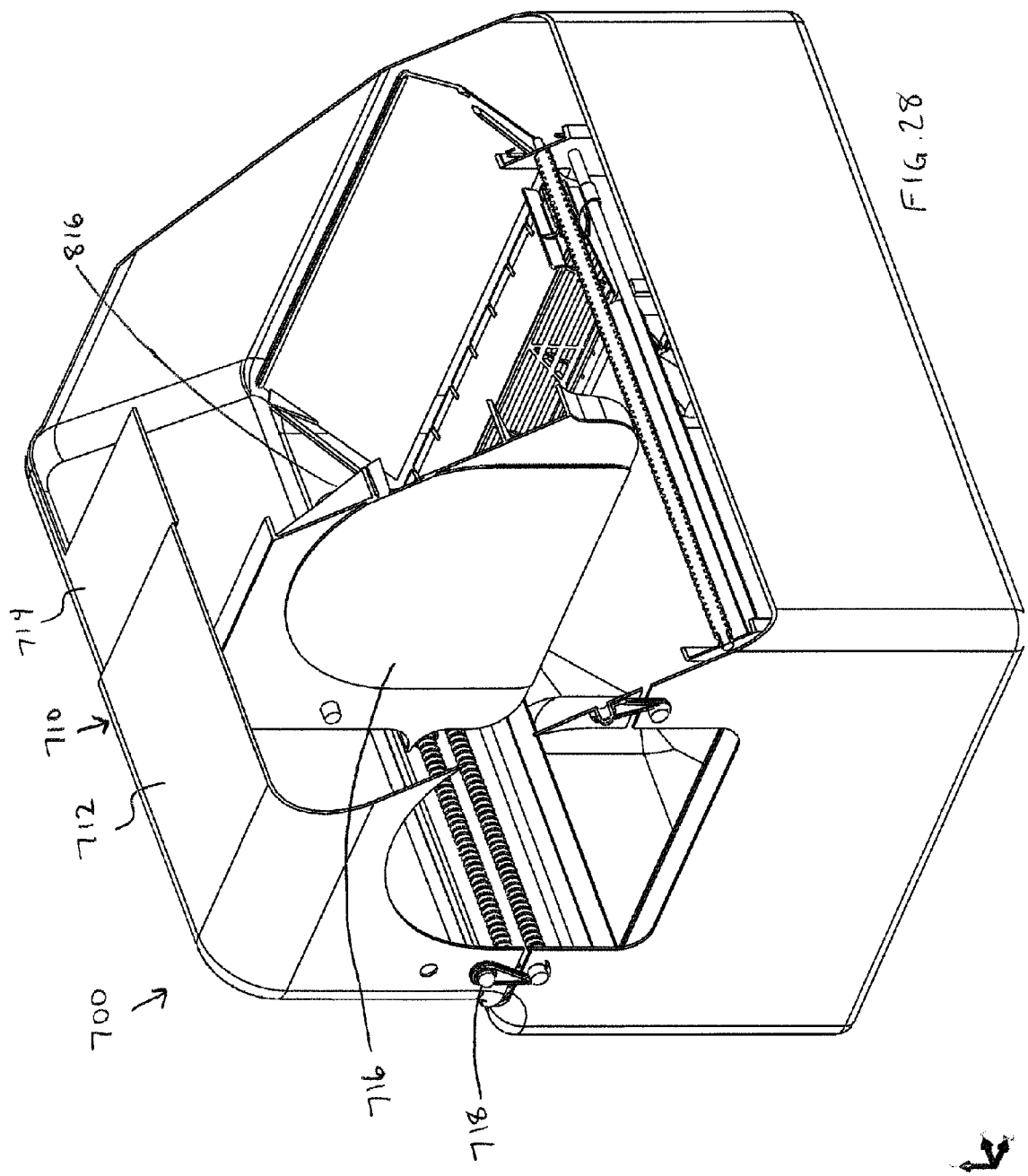

ered, one or more third configurations in which the cat litter return bin is disposed over the cat litter tray to deliver the recycled cat litter to the cat litter tray.

CAT LITTER BOX SYSTEM

RELATED APPLICATIONS

This application is a non-provisional application based on U.S. Provisional Patent Application 61/348,803, filed May 27, 2010, and U.S. Provisional Patent Application 61/433,019, filed Jan. 14, 2011, the contents of which are incorporated herein by reference in their entirety.

FIELD

The present disclosure generally relates to a cat litter box including an automated litter tray cleaning cycle.

BRIEF DESCRIPTION OF THE DRAWINGS

The features and advantages of the disclosure will be more fully understood with reference to the following description of the invention when taken in conjunction with the accompanying figures, wherein:

FIG. 5 illustratively depicts the operation of a network of cat litter boxes according to an exemplary embodiment of the present invention;

FIG. 6 is a partially cut-away perspective view of a cat litter box according to an exemplary embodiment of the present invention;

FIG. 7 is a perspective view showing a cat litter tray drive system and a base frame according to an exemplary embodiment of the present invention;

FIG. 11-14 are plan views showing the pivotal movement of a filter as the return bin is driven upwards by a return bin drive system according to an exemplary embodiment of the present invention;

FIG. 18 is a perspective view showing a hopper in a fully opened position as it fills a return bin with cat litter according to an exemplary embodiment of the present invention;

FIGS. 23-25 are perspective views showing the operation of a return bin as it is driven over cat litter tray according to an exemplary embodiment of the present invention;

FIG. 26 is a partially cut away perspective view of a cat litter box according to an exemplary embodiment of the present invention;

FIG. 27 is a perspective view of a cover drive system according to an exemplary embodiment of the present invention; and FIG. 28 is a partially cut away perspective view of a cat litter box according to an exemplary embodiment of the present invention.

SUMMARY OF THE INVENTION

Figure 1A:
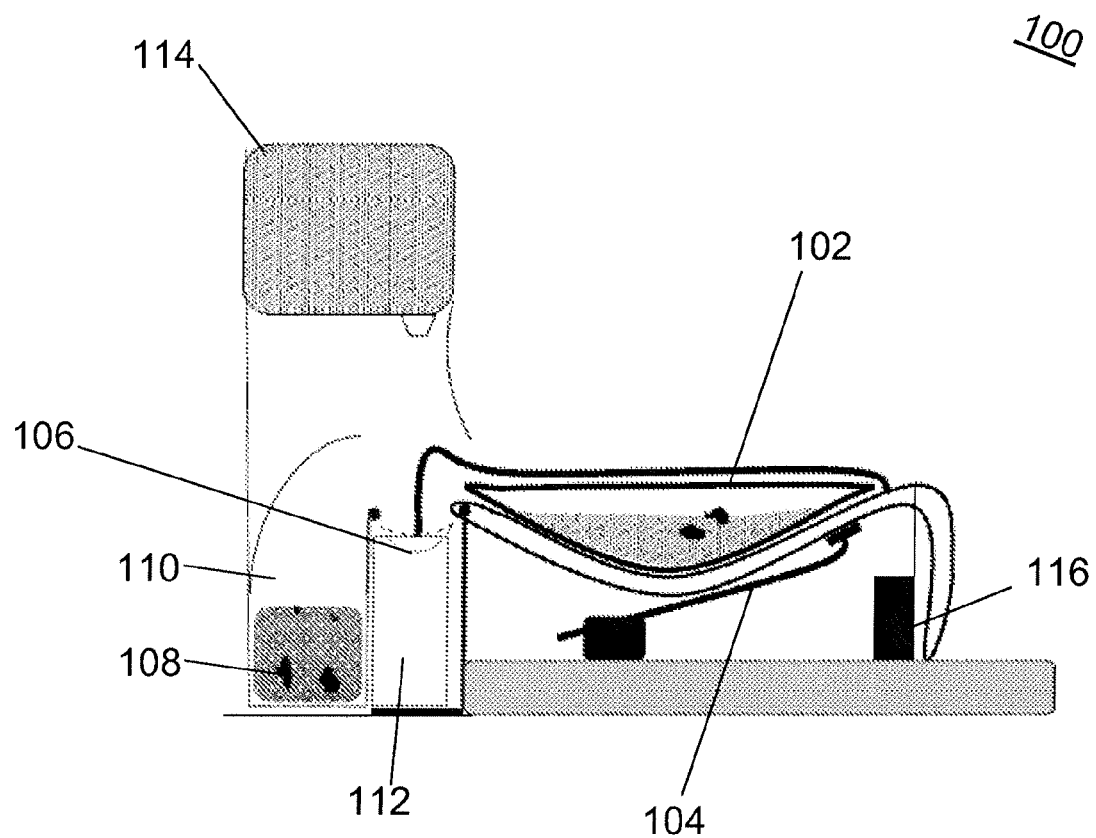
FIGS. 1A-1F illustratively depict a cat litter box system capable of substantially emptying the contents of the litter tray in accordance with exemplary embodiments of the disclosure.

An automated cat litter box according to an exemplary embodiment of the present invention comprises: a cat litter tray; a cat litter return bin that collects unsoiled cat litter from the cat litter tray and that returns recycled cat litter to the cat litter tray; a control unit; and one or more drive units operated by the control unit to drive the cat litter tray and the cat litter return tray to automatically recycle the unsoiled cat litter during a cat litter box cleaning cycle.

In an exemplary embodiment, the one or more drive units automatically pivot the cat litter tray between a first configuration in which the cat litter tray may be used to collect cat waste and a second configuration in which the cat litter tray may be emptied into the cat litter return bin.

In an exemplary embodiment, the automated cat litter box further comprises a hopper, and the one or more drive units move the cat litter return bin between a first configuration in which the cat litter return bin is in position to collect unsoiled cat litter from the cat litter tray, a second configuration in which the cat litter return bin is in position to collect fresh cat litter from the hopper, and one or more third configurations in which the cat litter return bin is disposed over the cat litter tray to deliver the recycled cat litter to the cat litter tray.

In an exemplary embodiment, the automated cat litter box further comprises: a filter; and a waste bin, wherein the filter is disposed within the cat litter return bin when the cat litter return bin is in the first configuration, and the filter is disposed out of the cat litter return bin and in position to dispose of filtered waste to the waste bin when the cat litter return bin is in the second configuration.

In an exemplary embodiment, the waste bin comprises a waste bin cover, and the waste bin cover is substantially closed when the cat litter return bin is in the first configuration and the waste bin cover is substantially open when the cat litter return bin is in the second configuration.

In an exemplary embodiment, the automated cat litter box further comprises one or more pivot arms that attach the waste bin cover to the cat litter filter.

In an exemplary embodiment, the one or more drive units comprise one or more of the following types of drives: screw drives and chain drives.

In an exemplary embodiment, the cat litter return bin comprises one or more wheels that allow the cat litter return bin to move to the one or more third configurations.

In an exemplary embodiment, the cat litter tray comprises a raised rim that contacts the wheels so that the cat litter return bin is guided over the cat litter return bin when moving to the one or more third configurations.

In an exemplary embodiment, the cat litter return bin comprises a bottom wall that is pivotal between one or more open configurations and a closed configuration, and the bottom wall is in the closed configuration when the cat litter return bin is in the first and second configurations, and the bottom wall is in the one or more open configurations when the cat liter return bin is in the one or more third configurations.

In an exemplary embodiment, the bottom wall comprises fins that evenly spread the recycled cat litter over the cat litter tray.

In an exemplary embodiment, at least one of the one or more drive units comprises a motor.

In an exemplary embodiment, one of the one or more drive units comprises a guide rail and wheels that travel within the guide rail, and the one of the one or more drive units drives the cat litter tray.

In an exemplary embodiment, the automated cat litter box further comprises a monitoring system that detects a cat's behavior relative to the cat litter box.

In an exemplary embodiment, the automated cat litter box further comprises a base frame that supports at least one of the cat litter tray, the cat litter return bin and the one or more drive units.

In an exemplary embodiment, the automated cat litter box further comprises a cover that covers at least the cat litter return bin.

In an exemplary embodiment, the cover comprises a front cover component and a back cover component, the front cover component being moveable relative to the back cover component between a first configuration in which the cat litter tray is covered by the front cover component and a second configuration in which a substantial portion of the cat litter tray is not covered by the front cover component.

In an exemplary embodiment, the one or more drive units automatically move the front cover component between the first and second configurations.

In an exemplary embodiment, the cover comprises a door, and the one or more drive units automatically move the door to seal the cat litter box during the cleaning cycle.

In an exemplary embodiment, the control system comprises one or more computers that perform one or more of the following functions: network with other cat litter box computers, collect and send data to one or more other computers, and receive control signals from one or more other computers.

DETAILED DESCRIPTION

Referring to FIGS. 1A-1F, the cat litter box system can be configured to include a litter tray cleaning cycle such that, after use by a cat, the contents of the litter tray are substantially emptied into a filter separating out the clean litter from the dirty litter. After being substantially emptied and filtered, the litter box is refilled by the filtered clean litter and, if needed, additionally filled by a hopper.

As shown in FIG. 1A, initially, cat litter box 100 including litter tray 102 is filled with a quantity of litter. After an animal uses litter tray 102 (e.g., urinates and/or defecates) a sensor (not shown) capable of detecting the animal's entrance and/or exit detects the animals presence and begins the litter tray cleaning cycle. This sensor may be a weight sensor. In some instances, a timer (not shown) can be used to delay the start of the litter tray cleaning cycle.

Figure 1B:
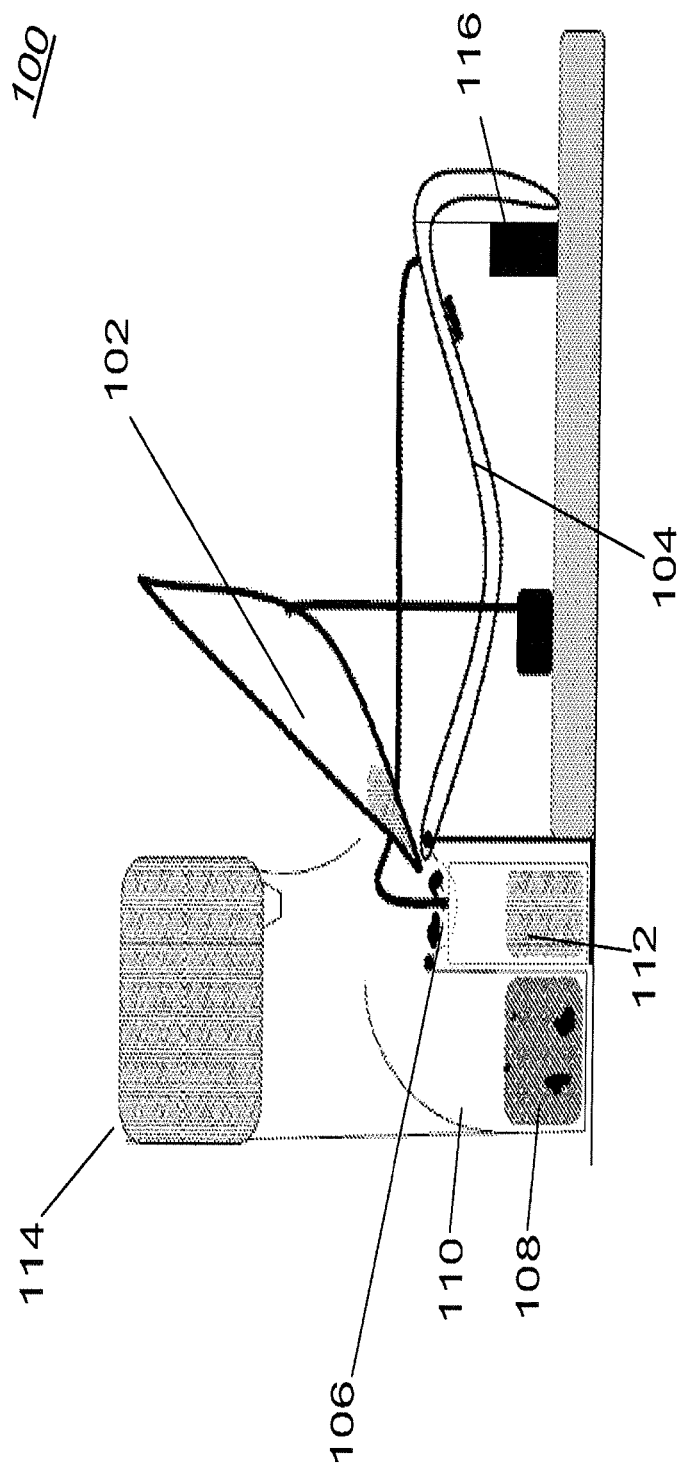

Referring to FIG. 1B, litter tray 102 can be substantially emptied using an electro-mechanical process. For example, litter tray 102 can be emptied by tilting up on one side of litter tray 102 by a lift mechanism 104 and allowing substantially the entirety of litter to be poured out of litter tray 102. The poured litter then flows through a litter filter 106. Litter filter 106 may have more than one layer, allowing it to filter large, medium, and small clumps of soiled litter. Litter filter 106 may also be designed to channel litter flow for a more even distribution as the litter moves through litter filter 106. Litter filter may also be designed so that the filter membrane is easily removable and replaceable.

Figure 1C:
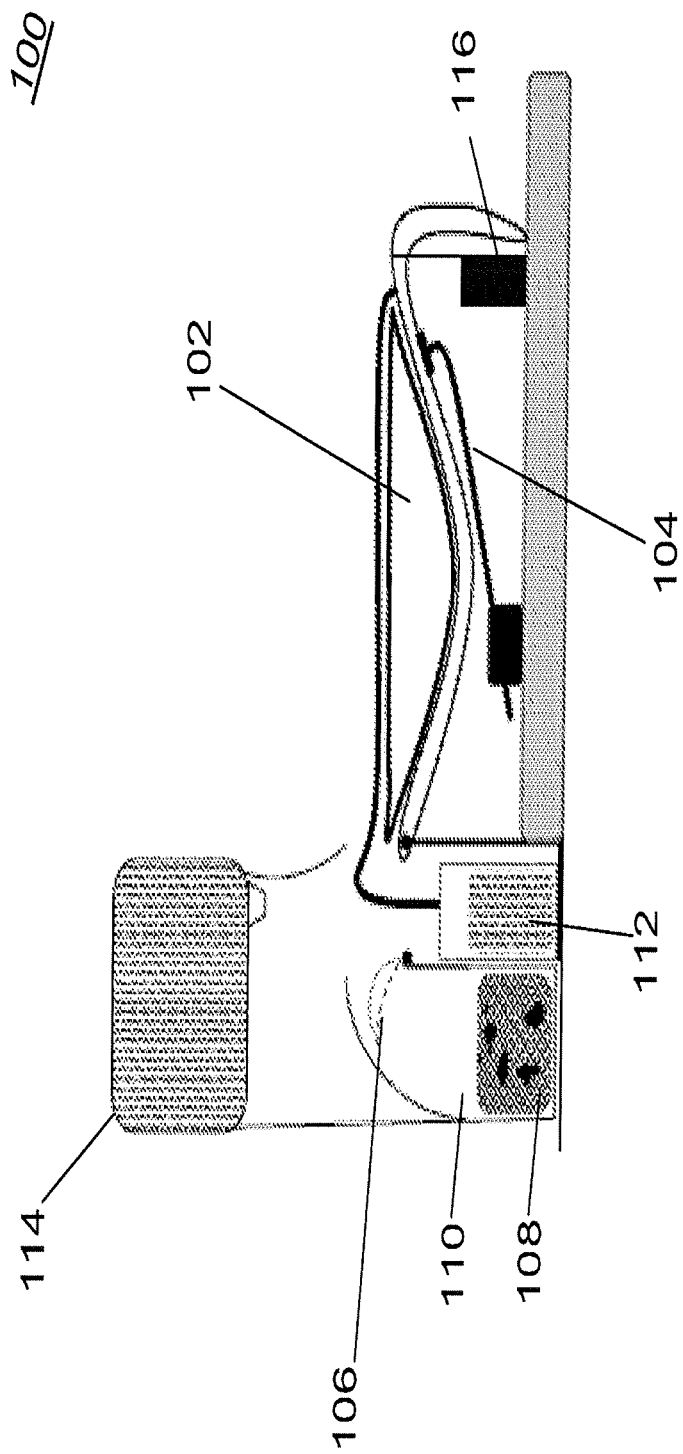

Referring to FIG. 1C, the filtered waste items 108 can then be ejected from litter filter 106 into a waste bin 110. Waste bin 110 can hold a quantity of waste and can be easily removed. The filtered unclumped or "clean" litter that is separated from the waste items 108 can be caught in a litter return bin 112.

Figure 1D:
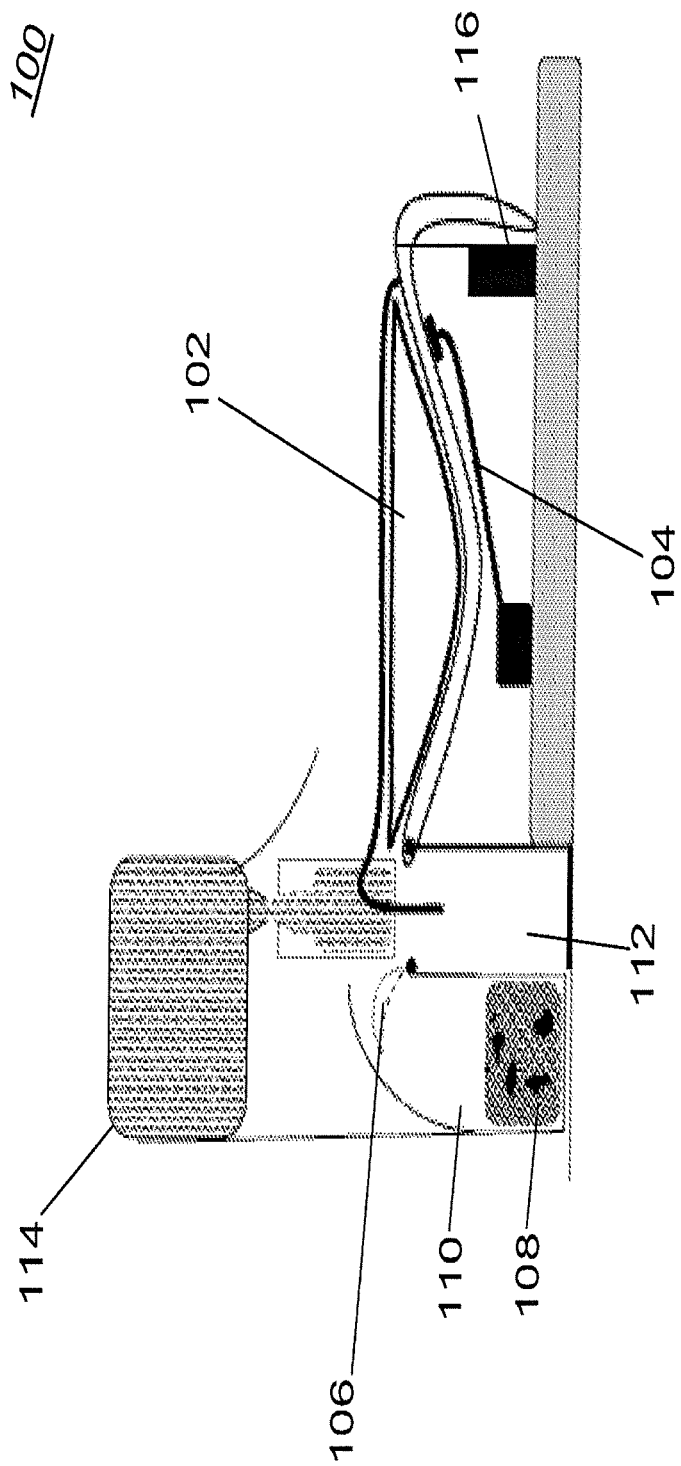
Figure 1E:
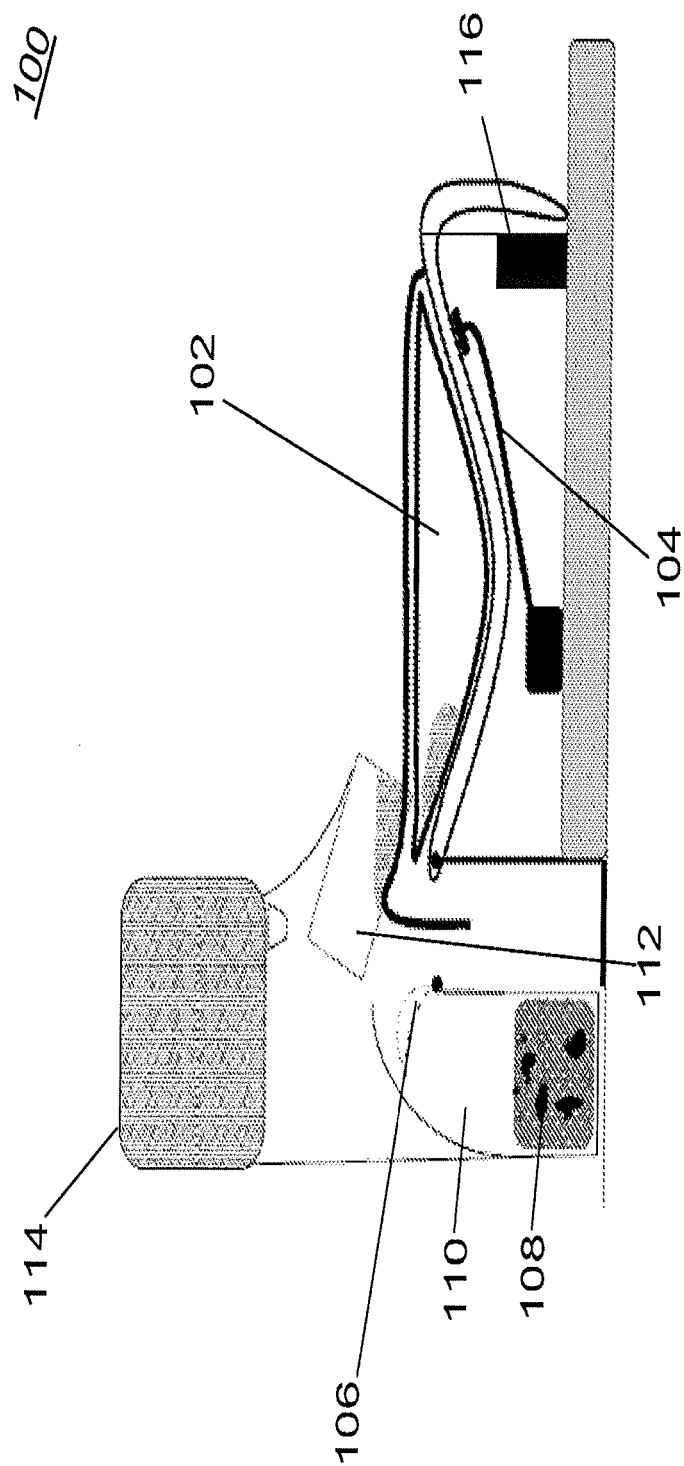
Figure 1F:
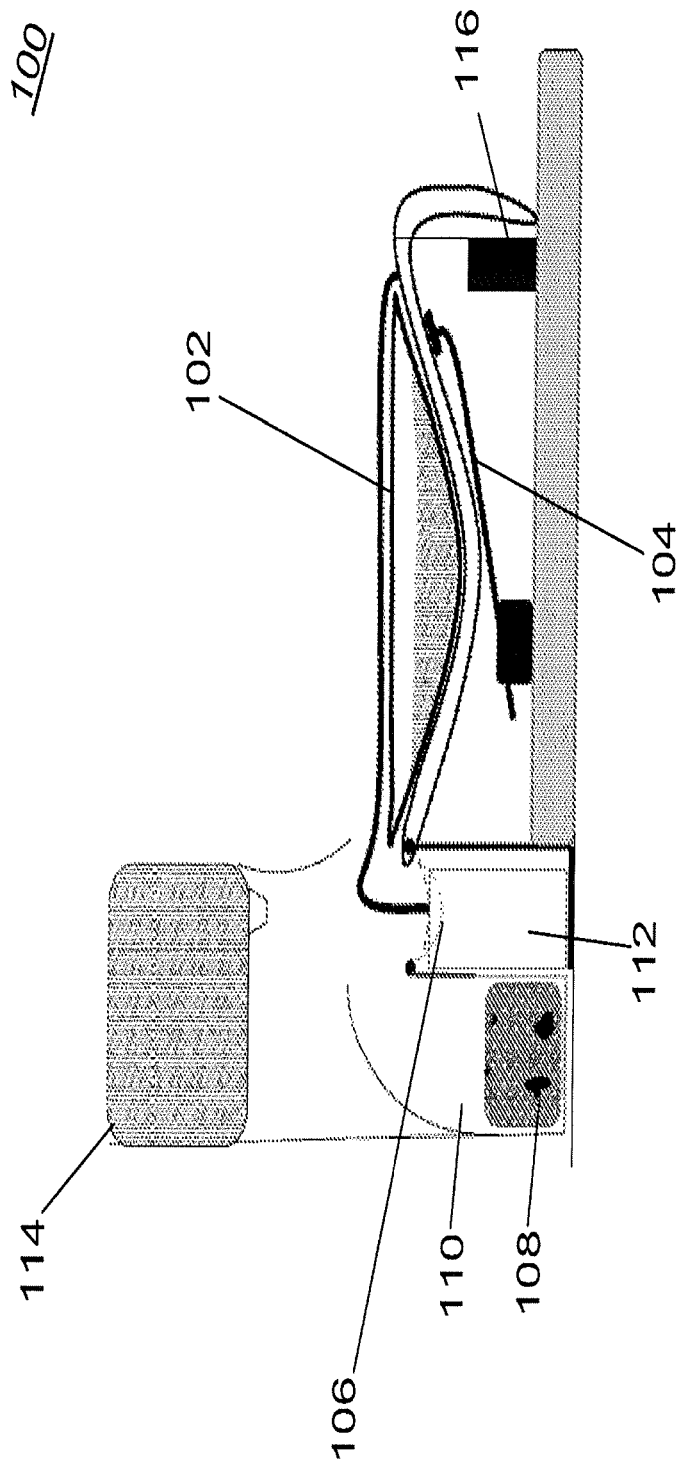

Referring to FIG. 1D-1E, litter return bin 112 can move relative to litter tray 102 and can replenish litter tray 102. For example, the litter return bin 112 can be transported up and over litter tray 102, releasing and spreading the clean litter back into empty litter tray 108. Then, referring to FIG. 1F, litter return bin 112 returns to its starting position.

Referring back to FIG. 1D, in some instances, prior to releasing the clean litter, litter return bin 112 can be filled. For example, prior to releasing the clean litter, litter return bin 112 may stop at a "refill" point at a new litter hopper 114. New litter hopper 114 can, for example, hold either loose litter that can be added by a user, or it can accommodate a separate litter bottle through a connection. New litter hopper 114 can also have a "reservoir" area, so that the unit can still function with an empty (or not [un]connected litter bottle). This may also assist in changing connected litter bottles.

New litter hopper 114 can also have a release mechanism that allows new litter to be added to litter return bin 112, as the volume of litter in litter tray 102 is depleted through clumping and disposal. This can allow for the specified quantity of litter to be maintained in litter tray 102 at all times. It may also reduce the user's involvement in refilling litter.

A computer 116 in communication with another computer and/or a computer network, and associated computer software can be used. For example, data can be collected and transmitted through one or more wired or wireless computer networks. Software used on a computer can interpret the data and take actions as defined by the software. Actions might include sending a message to the user through an email service, outside website, or Bluetooth device, etc. Such software may be implemented as computer-readable code that, when read by a computer processor, causes the cat litter box 100 to perform one or more operations, such as, for example, a cleaning cycle that involves a number of operations performed in a specific sequence with specific timing parameters.

Figure 3:
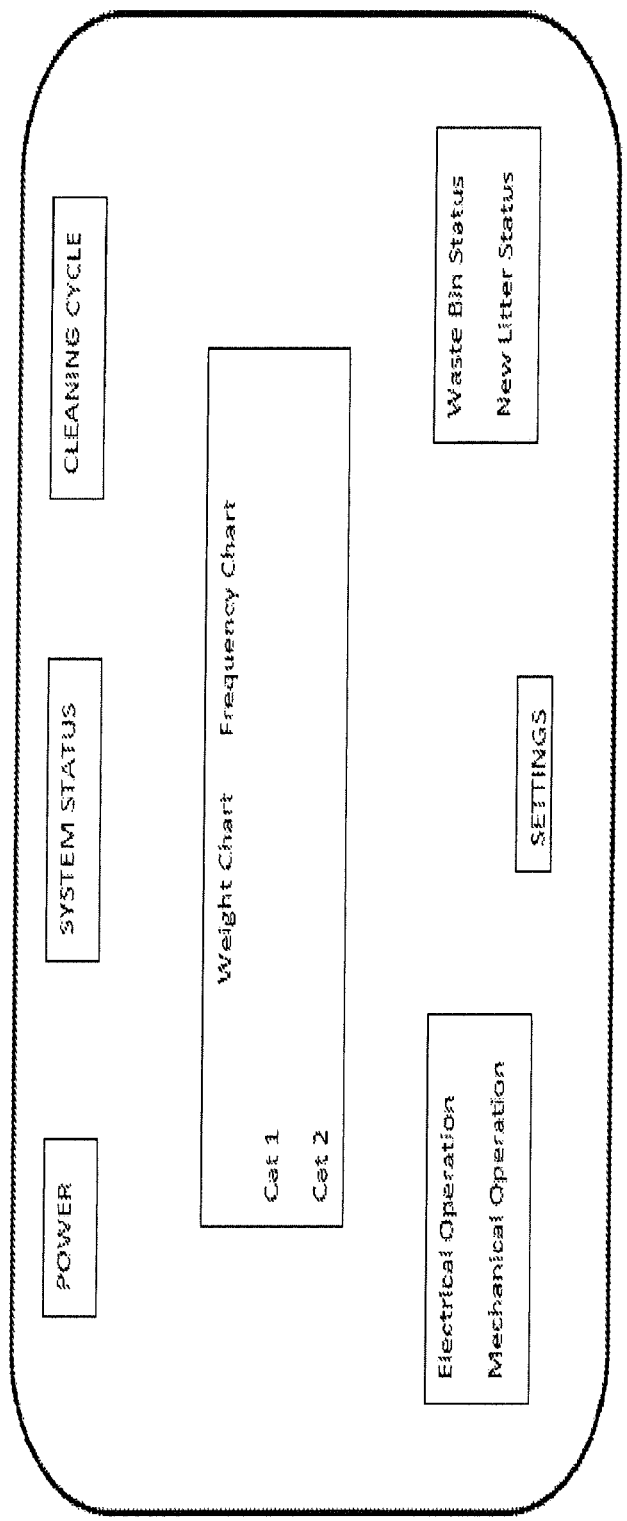
FIG. 3 illustratively depicts a user interface in accordance with exemplary embodiments of the disclosure.

For example, referring to FIG. 3, applications of data collected and transmitted can include, but is not limited to, operation of components, such as cycle times, electrical measurements, etc.; user alerts to refill the new litter hopper 114, empty the waste bin, respond to error messages, etc.; monitor the placement/removal of new litter bottles that can allow for an "auto-reorder" process, so that the user has an adequate supply of litter on-hand at all times. In exemplary embodiments, it should be appreciated that the cat litter box 100 may include any combination of software and/or hardware components that allow for full or partial automation of the cat litter box 100. One or more of the software and/or hardware components may be disposed within the cat litter box 100, while other software and/or hardware components may be disposed external to the cat litter box 100.

Specialized litter bottles pre-filled with litter may be provided as a service in conjunction with cat litter box system 100.

Further, cat litter box 100 can include an identification system, such as a radio-frequency identification (RFID) system, in order to track individual cat activity. As part of a monitoring system, data with important health implications, such as average trips to cat litter box system 100 per a set period of time can be stored and transmitted. User alerts can be sent if there is a significant change in behavior, such as no visits to cat litter box system 100 in 24 hours. Parameters for determining whether to send an alert can be user-definable.

The monitoring system may include a weight sensor in litter tray 102, so that the cat litter box system 100 can store and transmit historical weight information on the cat(s) that use it. For example, user alerts can be sent if a weight change violates a range, where the range may be user definable. Use of a weight sensor may also allow for the identification of individual cats using litter box system 100. Use of a weight sensor may also allow for the determination of the type and quantity of waste left by a cat in litter box system 100, including the storage, retrieval, and transmission of such data.

Figure 4:
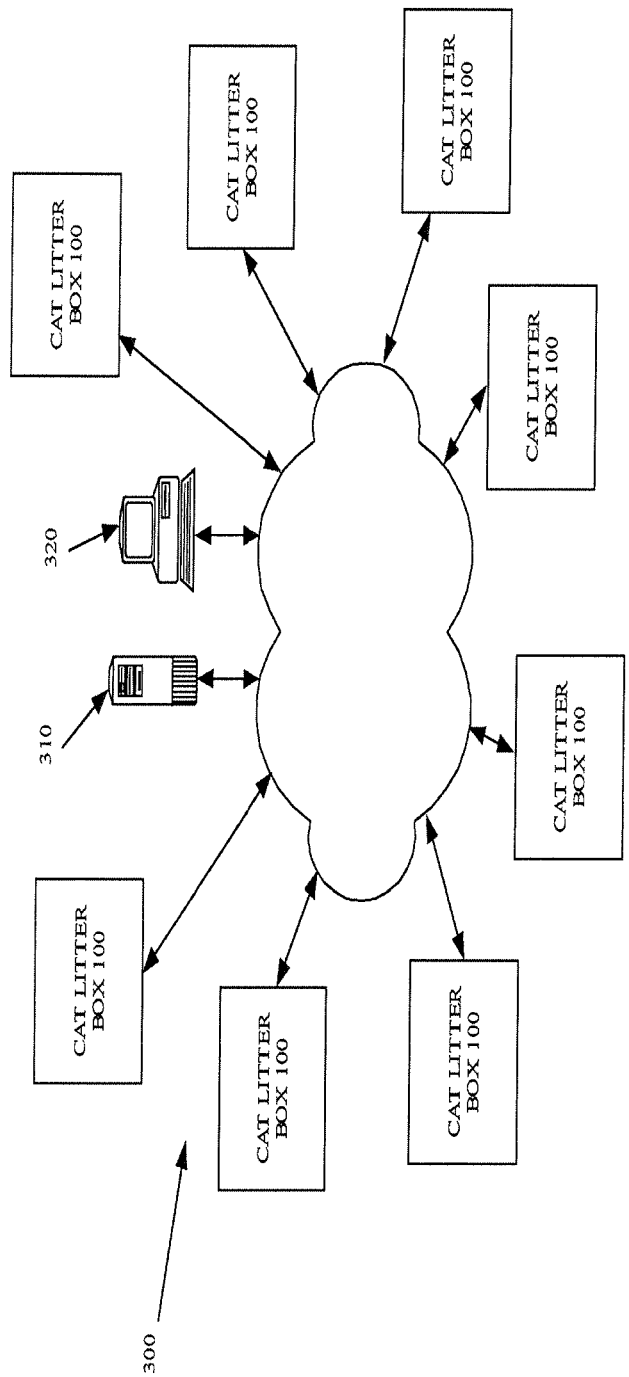
FIG. 4 illustratively depicts a network of cat litter boxes according to an exemplary embodiment of the present invention.

As shown in FIG. 4, a number of cat litter boxes 100, each including a computer 116, can be in communication with one another through a central network 300. The network 300 may be particularly useful when the cat litter boxes 100 are used in the same central location, such as, for example, at a house, breeder, veterinary clinic, etc. A central server 310 operably connected to a central computer system 320 of the network 300 may collect data from each of the computers 116 and may send instructions to each of the computers 116 regarding, for example, operation of components, such as cycle times, electrical measurements, etc.; user alerts to refill the new litter bin 114, empty the waste bin, respond to error messages, etc.; monitor the placement/removal of new litter bottles that can allow for an "auto-reorder" process, so that the user has an adequate supply of litter on-hand at all times. In an exemplary embodiment, the network computer system 320 may be used to set the time period for initiating a cleaning-cycle for each of the cat litter boxes 100 in the network. For example, a cleaning cycle for each of the cat litter boxes 100 within the network may be set to begin after a predetermined waiting period, such as, for example, a waiting period of 10 minutes, after an animal has used the cat litter box 100. It should be appreciated that the network 300 need not include a central computer, and instead the computers 116 of each cat litter box 100 may be in communication with one another to form the network 300 without a central computer. The cat litter boxes 100 within the network 300 may be in communication with one another via wired or wireless connections, such as, for example, Wi-Fi, Bluetooth, Ethernet, etc.

A problem that may arise within the network 300 of cat litter boxes 100 is that a first box's cleaning cycle may commence while a second animal is using a second box within the network. The noise from the first box's operation may scare the second animal, causing it to flee before it has "finished," creating a mess, and also providing negative feedback to that animal about using that litter box. In order to avoid this problem, the cleaning cycle may be set such that, when an animal enters one box on the network and triggers the on-board sensor in that box, all of the other boxes on the network will receive an electronic command to "reset" any pending cleaning-cycle countdown timers to a minimum waiting period, such as, for example, a minimum waiting period of two minutes.

FIG. 5 illustrates the operation of the network 300 according to an exemplary embodiment of the present invention. In this example, the cycle timer is set to 8 minutes. Initially, Box A and Box B are vacant, and therefore no timers are running. At network time 12:01, an animal may enter Box A, which triggers a sensor within Box A and the cleaning-cycle timer begins counting down from 8 minutes. At network time 12:08, Box A is now vacant, and the cleaning-cycle timer will expire in 1 minute. At this time, a second animal enters Box B, thereby triggering the sensor in Box B. A message may be sent from Box B to Box A via the network 300 to reset the timer in Box A for an additional 2 minutes. This will give the animal in Box B enough time to complete use of Box B without being frightened by a cleaning cycle operation commencing nearby in Box A. At network time 12:11, both Box A and Box B are vacant, the Box A timer has expired and the cleaning cycle in Box A has been initiated, and the Box B timer has 5 minutes remaining.

Figure 2:
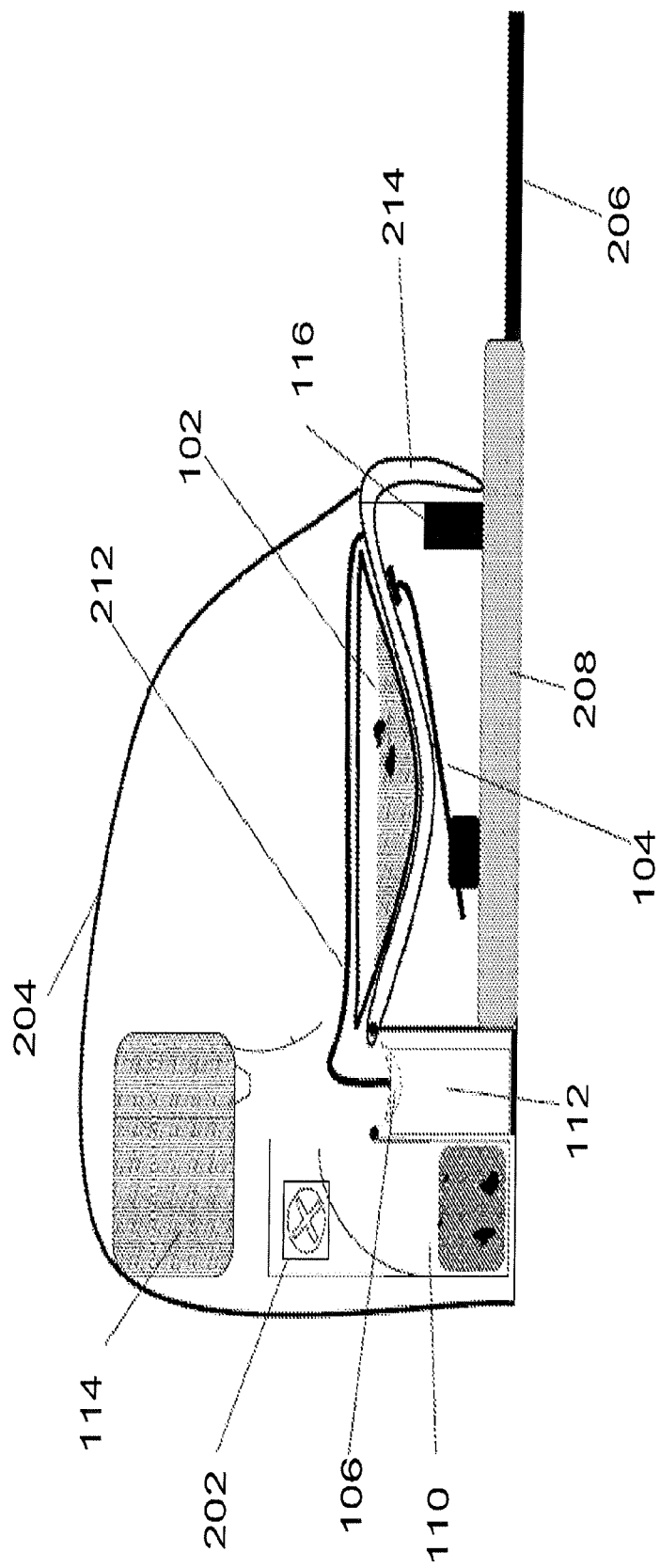
FIG. 2 illustratively depicts various elements of a cat litter box system in accordance with exemplary embodiments of the disclosure.

Referring to FIG. 2, cat litter box system 100 can also include an air filtration system 202, allowing air to be drawn from the outside, down through the base of cat litter box system 100, helping to minimize dust and odors. Further, the cat litter box system 100 can include a cover 204. The cover can have an opening for the animal's entrance and exit. The cover may be retractable, and may move back and forth over the litter tray, so that the system can be operated as an uncovered system or a covered one. The cover may be moved mechanically so that the system can be used by an animal in an uncovered configuration, and then automatically cover the litter area at the onset of the cleaning cycle. This will reduce dust and odors.

A retractable door may be used, so that the unit's egress can be mechanically blocked and unblocked. When the door is fully retracted, an animal may enter the litter area. Upon activation of the cleaning cycle, the door may automatically move forward until it finally forms a seal around the egress, thereby helping reduce dust and odors and preventing an animal from entering the system during a cleaning cycle.

The retractable cover and the retractable door may be attached to one another such that one mechanically operated component (the door, for example) can "push" and "pull" the other component (the cover, in this example) back and forth from a fully expanded position to a fully retracted position.

There can also be a retractable litter catch pad 206 that may, for example, extend from a base 208 under the door in cover 204. This may assist in the retention of scattered or tracked litter.

Cat litter box system 100 can further include a maintenance cycle. This maintenance cycle may empty litter tray 102 and lower litter tray 102 back into position after the waste has been expelled from the litter filter 106. At this point, a user can remove litter tray 102, waste bin 110, litter return bin 112, litter filter 106, etc. for cleaning and/or replacement. The entire quantity of used litter in the litter return bin 112 can be easily discarded.

Waste bin 110 can be designed to accommodate disposable bags, which may be odor-reducing.

Further, litter tray 102 can have sides that are inwardly curved at the top to help deflect scattered litter back into the box.

Cover 204 can be a full cover so the entire box is enclosed and may include an entrance door on one side. Further, cover 204 can be designed for simple placement and removal.

Further cat litter box 100 can include a track 212 that can be used by litter return bin 112 to move and distribute filtered litter.

Litter tray 102 can be a box with curved/angled sides to help redirect scattered litter back into the box. Litter tray 102 can be designed for optimal pouring into litter filter 106 and can be constructed of and/or coated with a non-stick material. Further cat litter box 100 can include a potential humidity mitigation system (not shown). Litter tray 102 can be designed for simple placement and removal. Litter tray 102 can rest on a tilting mechanism, so that box can be tilted to dump litter. Litter tray 102 may also be fitted with a weight sensor, in order to track cat activity.

Computer 116 can be capable of communicating to another computer via a network and/or wirelessly. Computer 116 can allow for the collection and transmission of relevant data and alerts regarding the operation of cat litter box system 100 and the cat(s) using it. Specific data can include, but is not limited to, component cycle times, electrical measurements, and other measures that reveal the operational characteristics of cat litter box system 100. User alerts can include those to refill the new litter hopper 114, empty waste bin 110, as well as error messages.

Further cat litter box 100 can also monitor the placement/removal of new litter bottles, allowing an "auto-reorder" process to provide an adequate supply of litter at all times. Specialized litter bottles pre-filled with litter may be provided as a service in conjunction with cat litter box system 100.

Further, cat litter box 100 can include and/or work with a weight sensor, an RFID tag and antenna system or another means to track individual cat activity. Health data can be generated as an alert to potential underlying health problems, such as kidney disease or diabetes. This may be especially helpful because as cats age, too much or too little urination can be a key early indicator of otherwise asymptomatic disease. In addition, a litter tray weight sensor allows cat litter box system 100 to monitor and provide historical weight information, also potentially important to detect changes in a cat's health status in between veterinary exams. Diseases such as hyperthyroidism are common in cats, and weight change is often the earliest indicator of underlying disease. Detection of disease-related weight changes may be the earliest indicators of underlying disease in an otherwise asymptomatic cat. Cat litter box 100 can alert the user if a cat does not use the box for an extended period of time. This can be especially important when the user will be away from the litter box for an extended period of time, during which time a cat is potentially isolated away from the litter box (locked in a separate area of a home, for example), sick and/or injured, etc.

New litter hopper 114 may allow for placement of new litter, either poured into the hopper or through a direct connection between the hopper and another litter container. New litter hopper 114 can be designed to have a reservoir system, allowing for replacement of a litter bottle before it is completely empty. New litter hopper 114 can be designed to add new litter to the litter return bin each time the litter return bin cycles through the system. If the litter return bin contains too little litter, new litter will be added from the hopper, ensuring a desired amount of litter is dispensed by the clean litter hopper into the litter tray 102 at all times.

Air filter 202 can provide a mechanism for air to be drawn from cat litter box system 100 through filter 202, preventing dust and odors from escaping. Air filter 202 can cycle on and off when cat litter box system 100 is in use.

Litter filter 106 can include a double or multi-layered screening device to separate large, medium, and small bits of clumped litter, while allowing clean litter to flow through and into the litter return bin. Litter filter 106 can be connected to a mechanism that swings litter filter 106 back and forth, into and out of the waste bin. As litter filter 106 is swung into waste bin 110, and against a stop, the force and downward angle can propel the waste into waste bin 110, in a back-to-front, bottom-to-top pattern, that can substantially increase waste storage capacity. Litter filter 106 may be made of or coated with a non-stick material. Litter filter 106 may be designed to be easily removable for cleaning, and/or replacement. Litter filter may be designed to swing back and forth using a passive mechanical system that is connected to another mechanical system.

Litter catch pad 206 can be pulled out of the base 208, allowing for an area for the catchment of scattered or tracked litter outside litter tray 102. Further, litter catch pad 206 can be adjusted by the user to accommodate usable floor space. Base 208 may incorporate a step up to the door (not shown) and can have a retractable litter catch pad 206.

Further cat litter box 100 can include a Frame 214. Frame 214 can be designed to hold litter tray 102 and may or may not be connected to lift mechanism 104.

Waste bin 110 can be designed to hold, for example, up to one month of waste from a single cat. Waste bin 110 can also include sealed mouth to contain odors. Waste bin door can be designed to open and close using a passive mechanical system that is driven by another mechanical system. Waste bin 110 can hold odor-reducing waste bags and waster bin 110 can be installed and removed with substantial ease.

Lift mechanism 104 can be designed to raise and lower litter tray for dumping of soiled litter.

Litter return bin 112 can catch clean litter poured through litter filter 106, and transport and distribute it back to litter tray 102. Litter return bin 112 can be lifted on an elevator platform, and then connect to a forward and reverse transport mechanism. When pulled forward off the elevator platform, the litter return bin 112 can have a door on its underside that will open and hang down, through which the clean litter can flow back into litter tray 102. The door can be designed to hang at a height that will spread the poured litter at the proper level. The door can also have "fins" to help control the distribution of litter in the tray.

In an exemplary embodiment, the cat litter box 100 may include a programmable 24-hour, 7-day system control timer. Such a timer may allows a user to schedule operable and inoperable periods for system cleaning cycle, as well as customizable cleaning cycle delay settings. For example, the user may set the system timer for a 30-minute cleaning cycle delay between the hours of 0800 and 1800, Monday through Friday, while the user is away at work and odor is not an issue and he wants waste to fully harden before being filtered. The user may set the timer for a 10-minute delay from 1800 to 2300 Monday through Friday, when he is at home and odor is more of a concern than fully hardened waste. The user may set the timer not to operate between the hours of 2300 and 0600, when he is asleep and does not want to be disturbed by the sound of the system running.

FIG. 6 is a partially cut-away perspective view of a cat litter box, generally designated by reference number 500, according to an exemplary embodiment of the present invention. The cat litter box 500 includes a cover 510, a base frame 520, a cat litter tray 530, a cat litter tray drive system 540, a cat litter return bin 550, a cat litter return bin drive system 560 (shown in FIG. 10), a cat litter filter 570, a waste bin 580, a hopper 590, and a cat litter return bin transport drive system 600. Each of these components will be described below with reference to FIGS. 6-8, which also show the operation of the cat litter box 500 during a litter tray cleaning cycle. Although the present description refers to separate drive systems for the cat litter tray and the cat litter return bin, it should be appreciated that one or more drive systems may be used to operate the one or more various components of the cat litter box.

Figure 8:
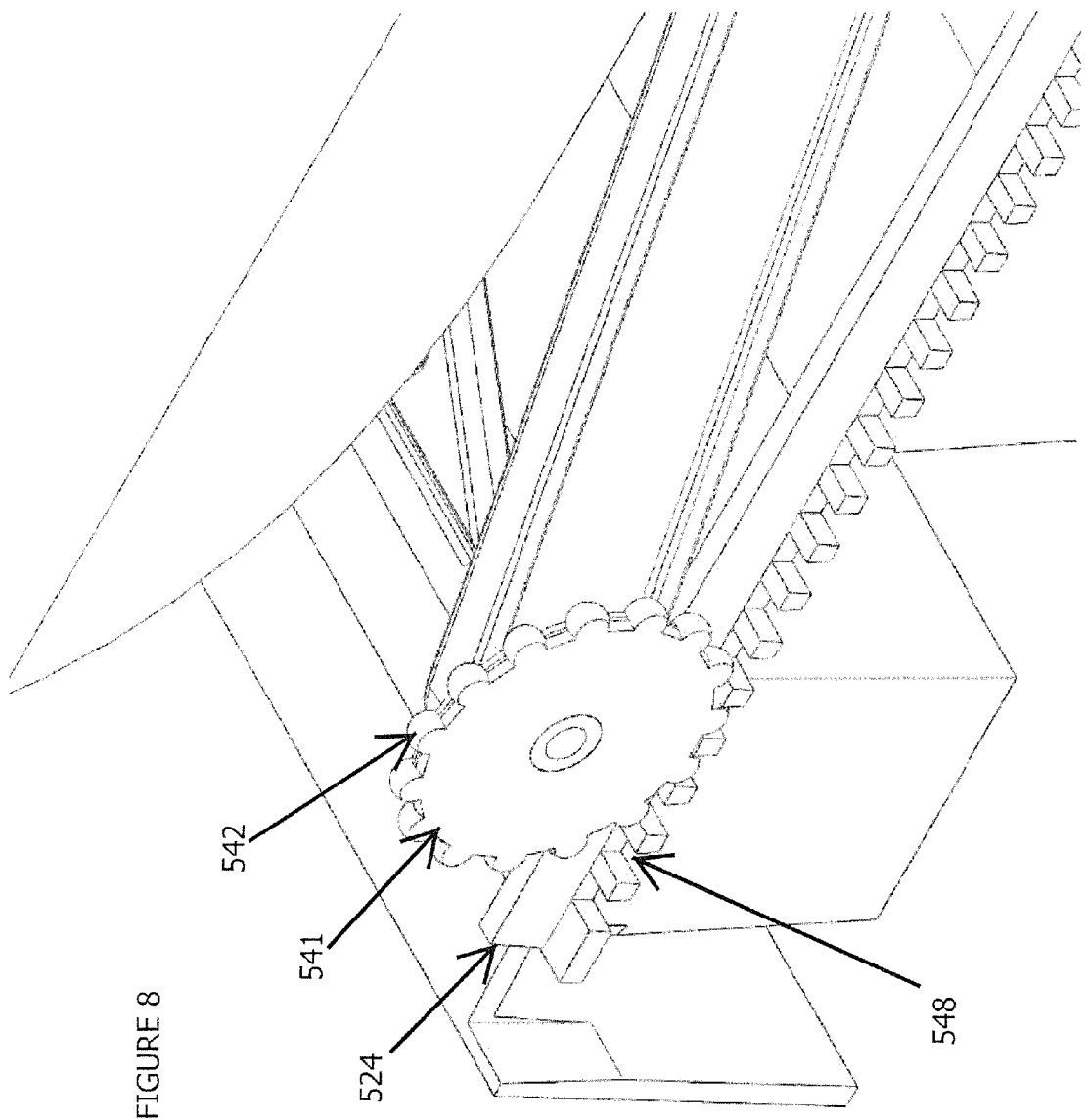
FIG. 8 is a partial perspective view of a cat litter box according to an exemplary embodiment of the present invention.

FIG. 7 is a perspective view showing the cat litter tray drive system 540 and the base frame 520 according to an exemplary embodiment of the present invention. The base frame 520 may include a number of frame elements 522 that support the various components of the cat litter box 500, including the components of the tray drive system 540. In this regard, the base frame 520 may include guide rails 524 that guide the movement of the tray drive system 540. In particular, as described in further detail below, the tray drive system 540 may include wheels 541 that are driven back and forth within the guide rails 524 so as to raise the cat litter tray 530 into a dumping position over the return bin 550 and lower the cat litter tray 530 back to its use position. As shown in FIG. 8, the wheels 541 may include a number of spherical ridges 542 around the outer circumference of the wheels 541 that protrude into corresponding openings 548 within the guide rails 524. The spherical ridges 542 and guide rail openings 548 allow the guide rails 524 to remain free of cat litter that may otherwise get trapped within the guide rails 524 and interfere with movement of the wheels 541. It should be appreciated that in other exemplary embodiments of the invention, the ridges 542 may have a shape other than spherical, such as, for example, rectangular or triangular.

Figure 9:
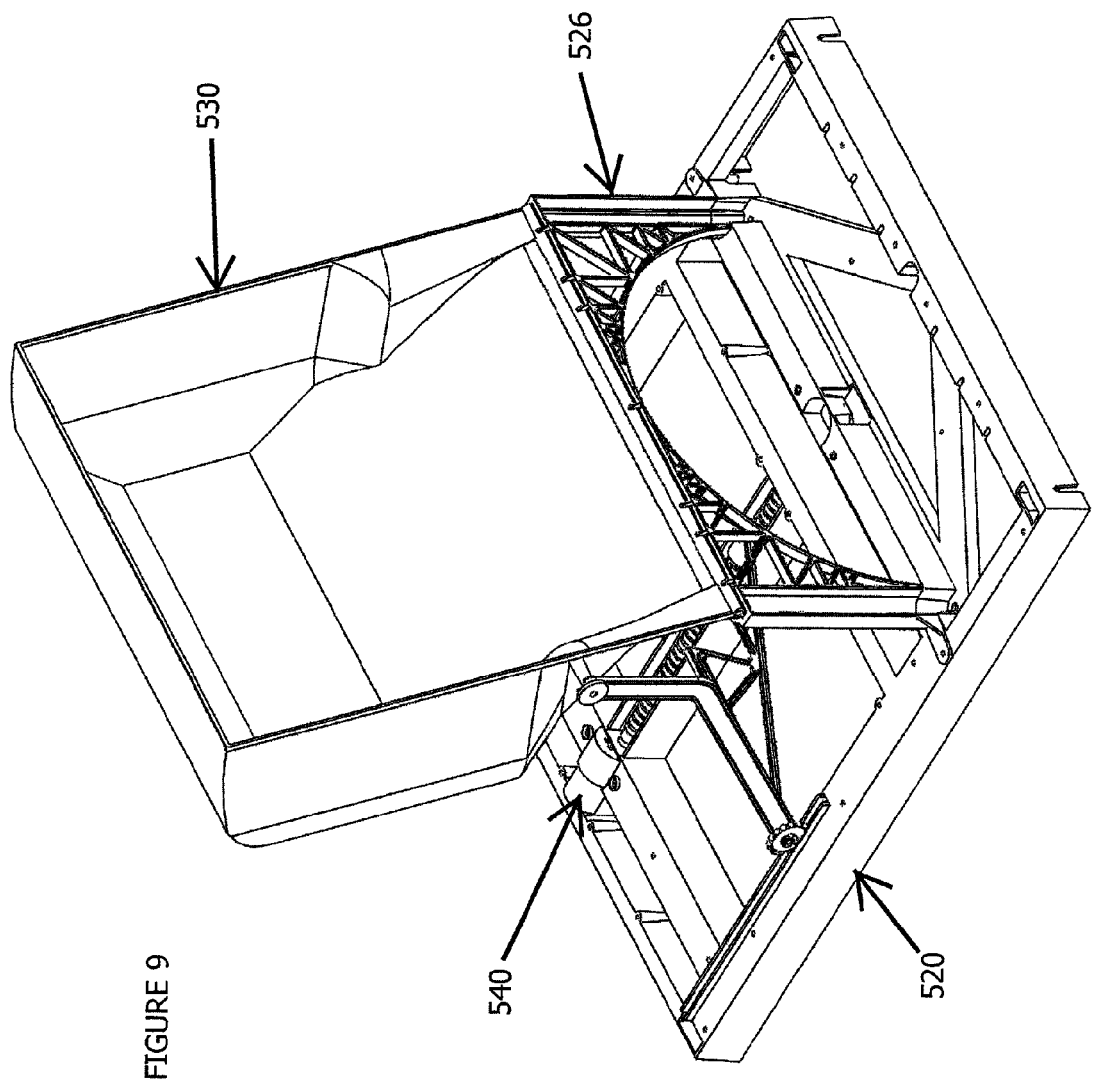
FIG. 9 is a perspective view showing a cat litter tray and a cat litter drive system according to an exemplary embodiment of the present invention.

The tray drive system 540 may include a motor 543 that drives a screw shaft 544. An internally threaded collar 545 translates the rotation of the screw shaft 544 by the motor 543 to straight-line motion of the wheels 541 within the guide rails 524. In this regard, the tray drive system 540 may include a tray drive system frame 546 that connects the collar 545 to the wheels 541. The tray drive system frame 546 may also include upwardly extending arms 547, the distal ends of which are pivotally connected to sides of the cat litter tray 530. As shown in FIG. 9, movement of the wheels 541 back towards the cat litter return bin 550 causes the tray 530 to pivot around its front end towards a dumping position. In this regard, the back end of the tray 530 may be hinged to the upper portion of a first support frame 526 that extends upward from the base frame 520. The tray 530 may be hinged to the first support frame 526 by any suitable hinging mechanism, such as, for example, a living hinge or a barrel hinge.

Once the contents of the tray 530 are dumped into the return bin 550, the return bin 550 is raised into position under the hopper 590 while the filter 570 is pivoted into a dumping position over the waste bin 580. As described in detail below, the return bin 550 may be driven up and down by the return bin drive system 560, which in turn causes the filter 570 to pivot into a dumping position and back into its original position within the return bin 550. In this regard, as shown in FIG. 6, the back end of the filter 570 may be hinged to the upper portion of a second support frame 528 that extends upwards from the base frame 520. The filter 570 may be hinged to the second support frame 528 by any suitable hinging mechanism, such as, for example, a living hinge or a barrel hinge. In an exemplary embodiment, the hinge is separable so that the filter 570 may be removed for cleaning or replacement by a new filter.

Figure 10:
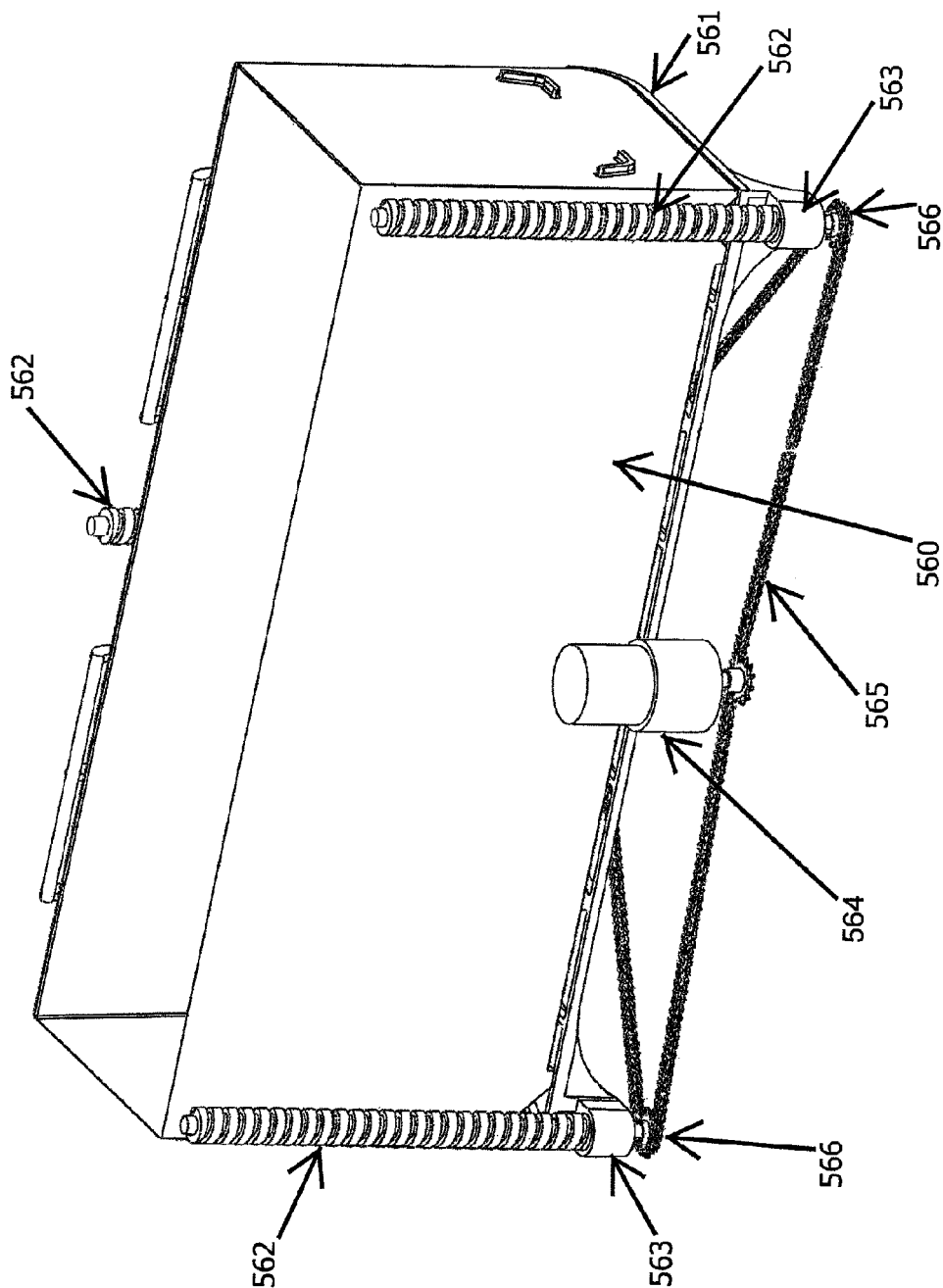
FIG. 10 is a perspective view showing a return bin and a return bin drive system according to an exemplary embodiment of the present invention.
Figure 11:
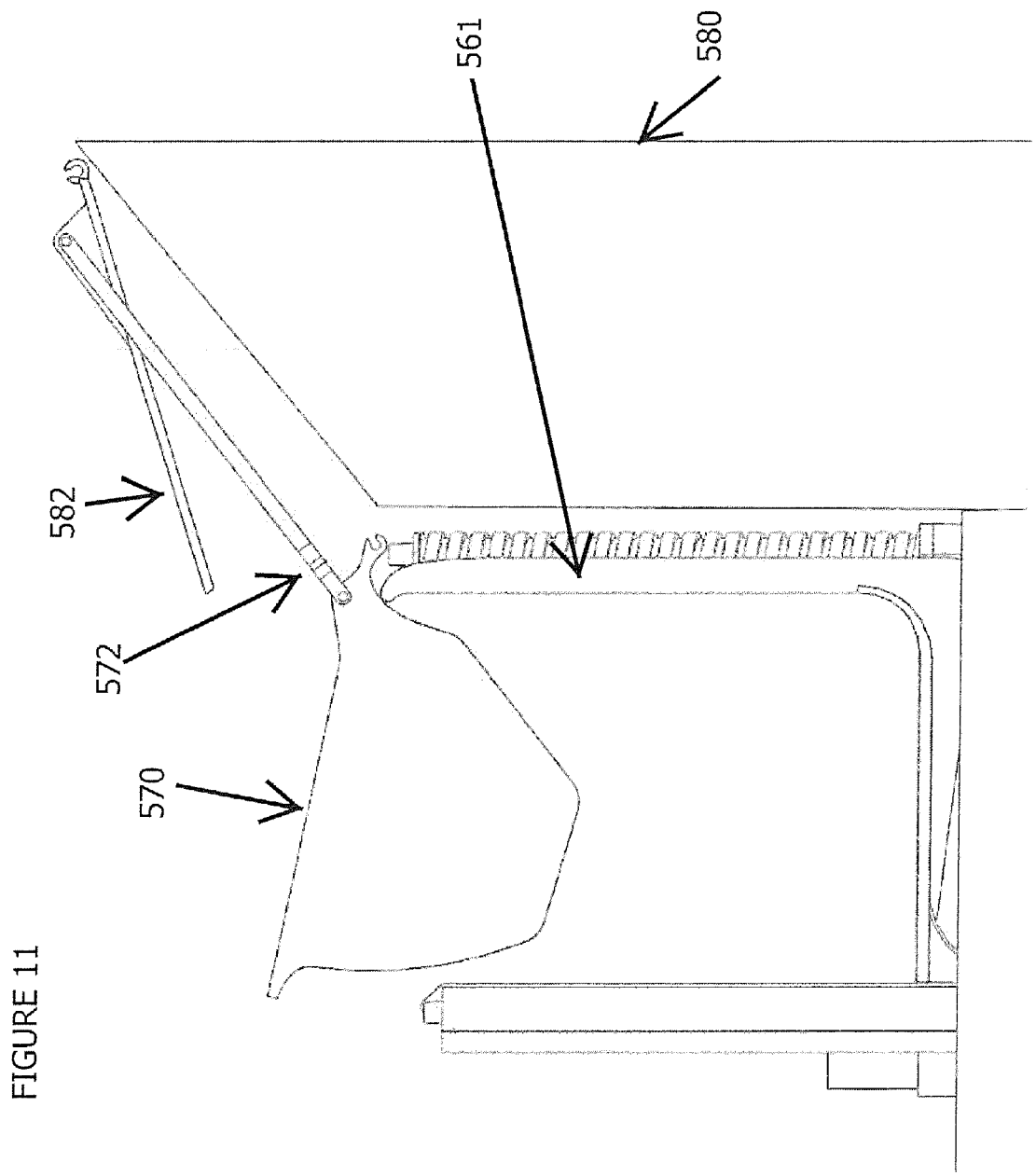
Figure 13:
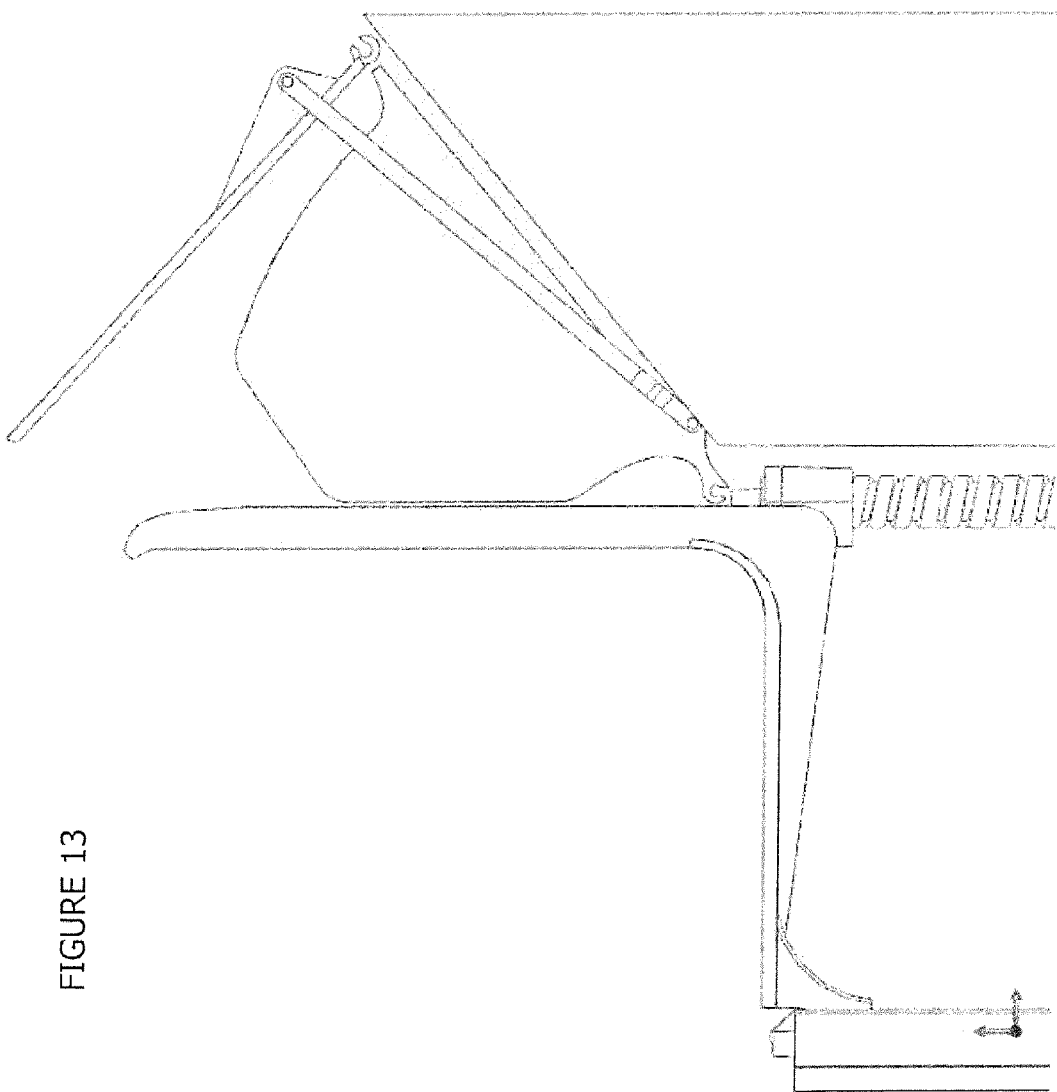

FIG. 10 is a perspective view showing the return bin 550 and return bin drive system 560 according to an exemplary embodiment of the present invention. The return bin drive system 560 may include an elevator frame 561 that is raised and lowered by rotation of screw drives 562 that are connected to internally threaded collars 563 of the elevator frame 561. The screw drives 562 may be driven by a chain drive including a motor 564, drive chain 565 and sprocket gears 566. The motor 564 drives the drive chain 565 to rotate the sprocket gears 566, which in turn rotate the screw drives 562 that are connected to the sprocket gears 566. The return bin 560 may rest on the elevator frame 561 so that the return bin 560 moves up and down with the driven elevator frame 561.

Figure 14:
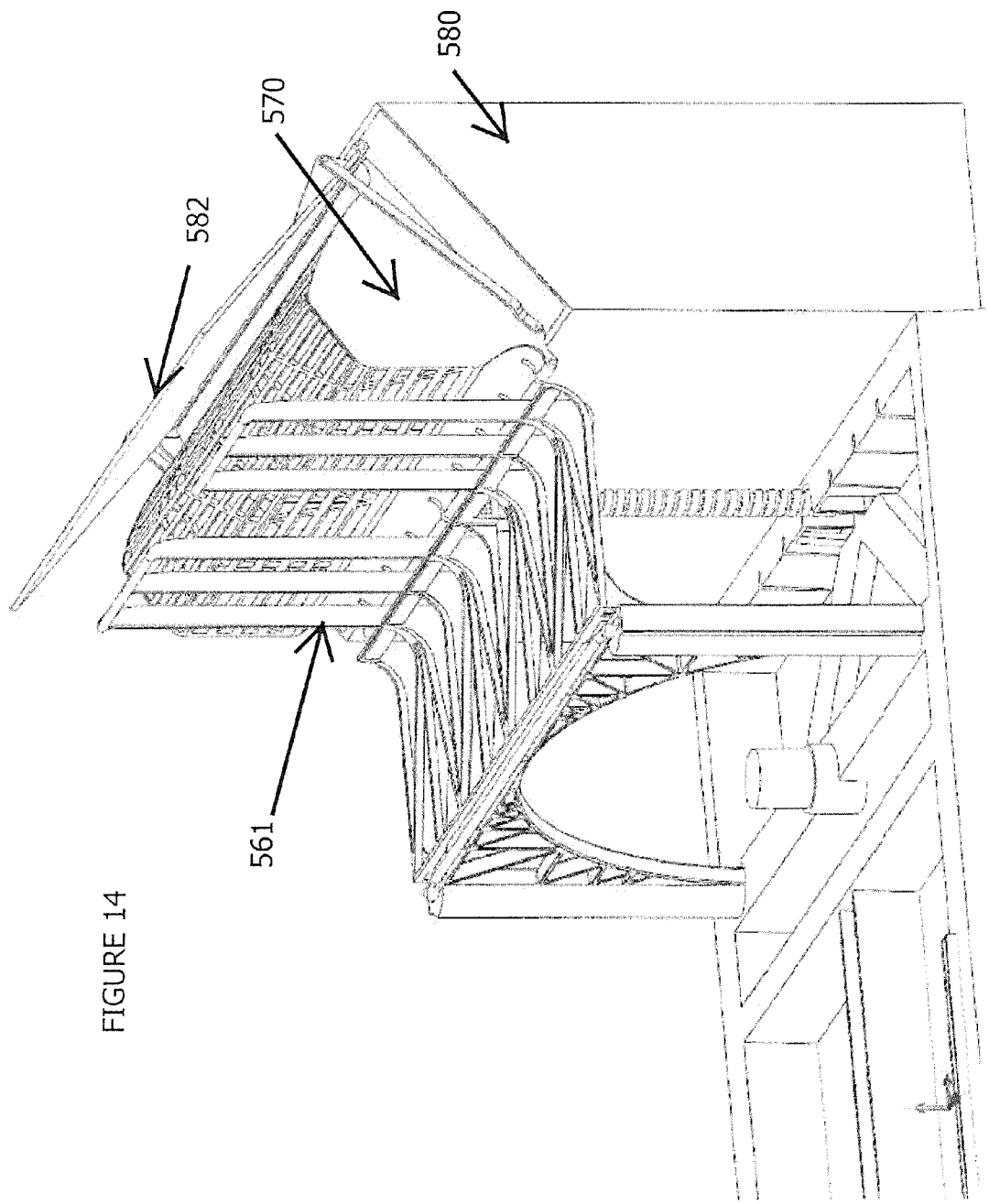

FIGS. 11-14 show the pivotal movement of the filter 570 as the return bin 550 is driven upwards by the return bin drive system 560 (for clarity, the return bin 550 is not shown in FIGS. 11-14). The filter 570 is pivoted back into a dumping position as the elevator frame 561 moves upwards by operation of the return bin drive system 560. The filter 570 may include lever arms 572, the distal ends of which are connected to a waste bin door 582. As the filter 570 pivots, lateral motion of the lever arms 572 cause the waste bin door 582 to pivot open so that the contents of the filter 570 may be dumped into the waste bin 580. FIG. 14 shows the elevator frame 561 in the completely raised position and the filter 570 pivoted back into the dumping position over the waste bin 580. After sufficient time to allow the cat waste to be dumped from the filter 570 into the waste bin 580, the elevator frame 561 may be lowered, which causes both the filter 570 to pivot back to its original position within the now lowered return bin 550 and the closure of the waste bin door 582.

Figure 15:
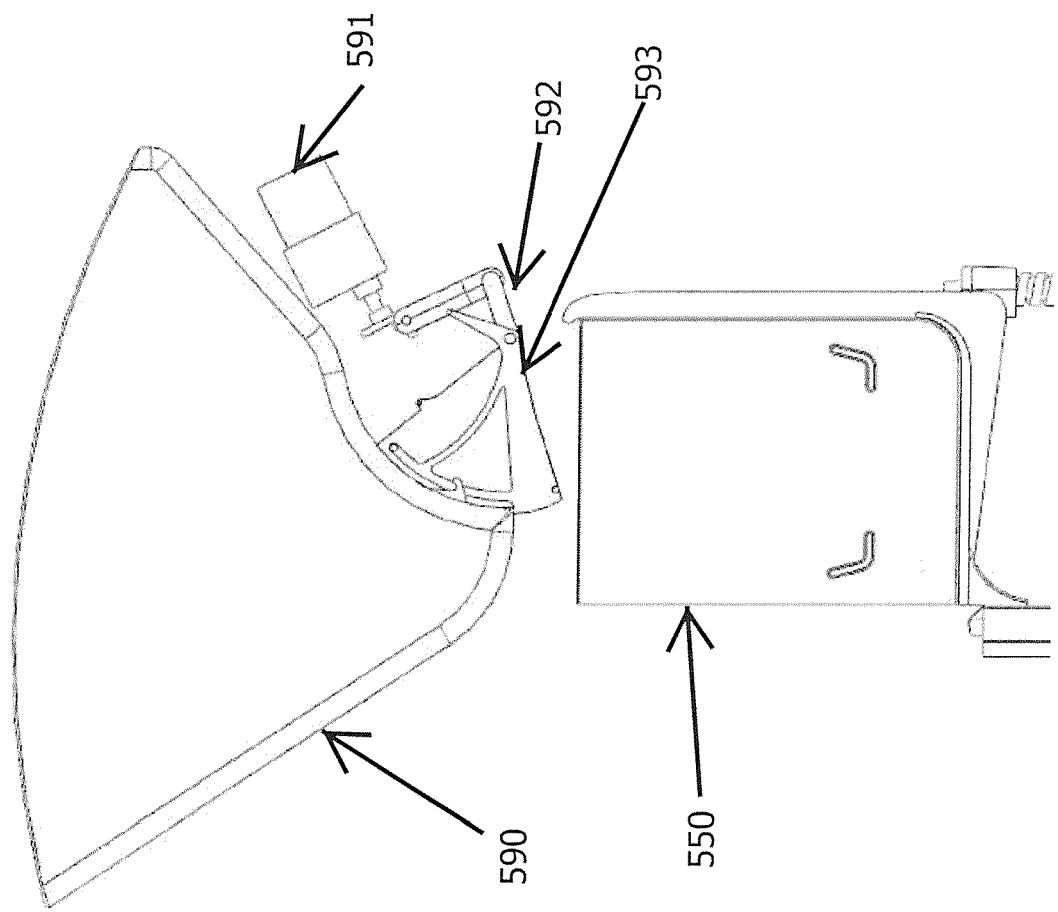
FIGS. 15-18 are cross-sectional view of a hopper as it fills a return bin with cat litter according to an exemplary embodiment of the present invention.
Figure 16:
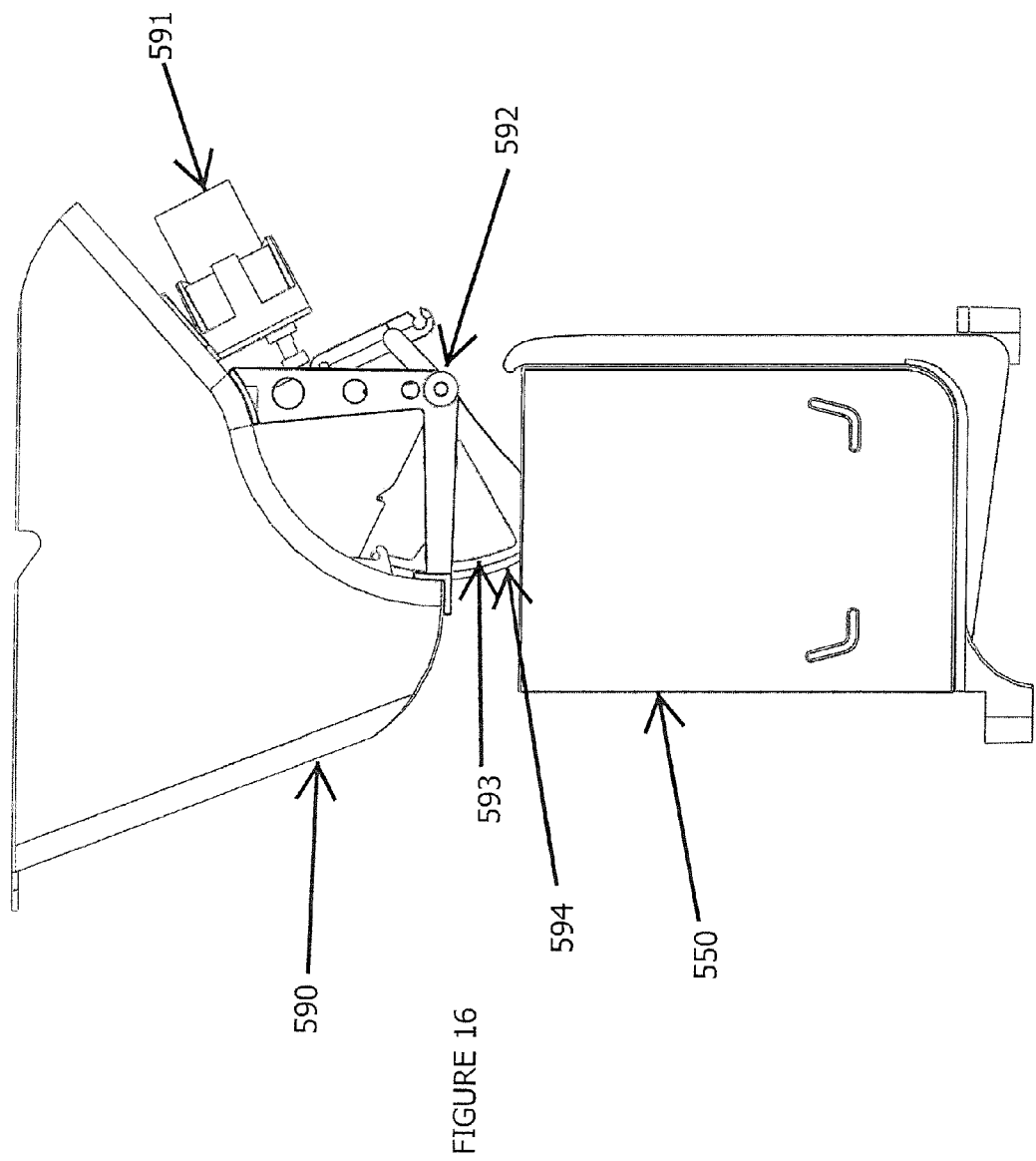
Figure 17:
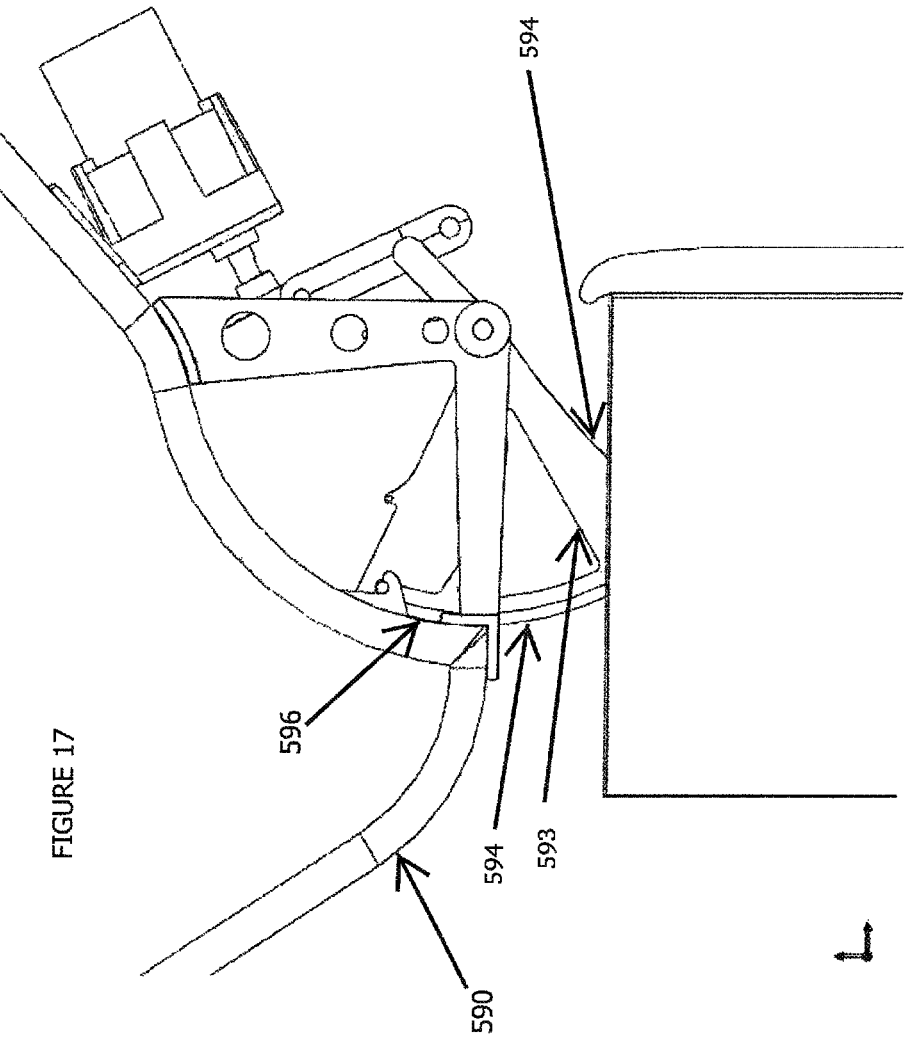
Figure 18:
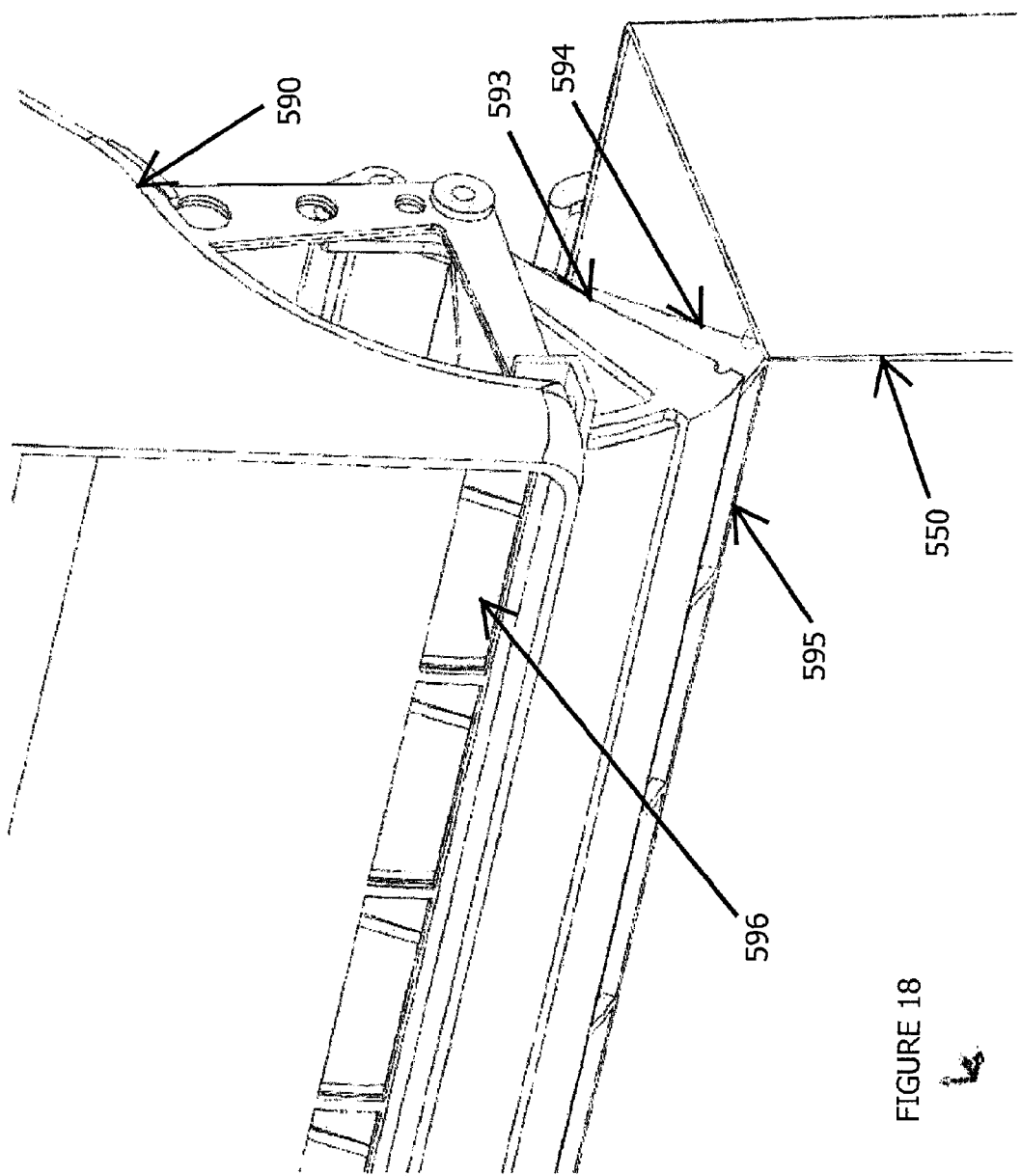

Before being lowered, the return bin 550 may be refilled with cat litter from the hopper 590. FIGS. 15-18 show the operation of the hopper 590 as it fills the return bin 550 with cat litter according to an exemplary embodiment of the present invention. In particular, FIGS. 15-17 are cross-sectional views of the hopper 590, and FIG. 18 is a perspective view of the hopper 590 when the hopper 590 is fully opened for delivery of cat litter to the return bin 550. The hopper 590 may include a motor 591 and a nozzle mechanism 592 that is controlled by the motor 591 to deliver cat litter to the return bin 550. The nozzle mechanism 592 may include a first nozzle portion 593 and a second nozzle portion 594. In an exemplary embodiment, only the second nozzle portion 594 may form the bottom wall of the nozzle mechanism 592. Operation of the motor 591 may cause the first and second nozzle portions 592, 593 to pivot relative to one another so that cat litter delivery slots 595 appear between the first and second nozzle portions 592, 593. At the same time, the pivoting of the second nozzle portion 593 may expose a hopper opening 596. The cat litter may then escape from the hopper opening 596 and fall onto the bottom wall of the nozzle mechanism 592 (formed by the second nozzle portion 594). The cat litter may then slide down the bottom wall of the nozzle mechanism 592 and escape from the delivery slots 595 into the return bin 550. In an exemplary embodiment of the invention, the hopper 590 may operate in a passive mode in that cat litter is allowed to flow out of the hopper 590 until the level of the cat litter within the return bin 550 reaches the same level as that of the nozzle mechanism 592, at which point no further cat litter can be released by the nozzle 592 into the return bin 550. After a set period of time determined to be sufficient to allow for the complete refilling of the return bin by the hopper/nozzle assembly, operation of the motor 591 may cause the first and second nozzle portions 592, 593 to pivot relative to one another so that cat litter delivery slots 595 between the first and second nozzle portions 592, 593 may be closed so that no further cat litter can be released by nozzle mechanism 592. At the same time, the pivoting of the second nozzle portion 593 may also close hopper opening 596 so that no further cat litter can be released by the hopper into the nozzle. It should be appreciated that any other control scheme, either passive or active, may be used to operate the hopper 590.

Figure 19:
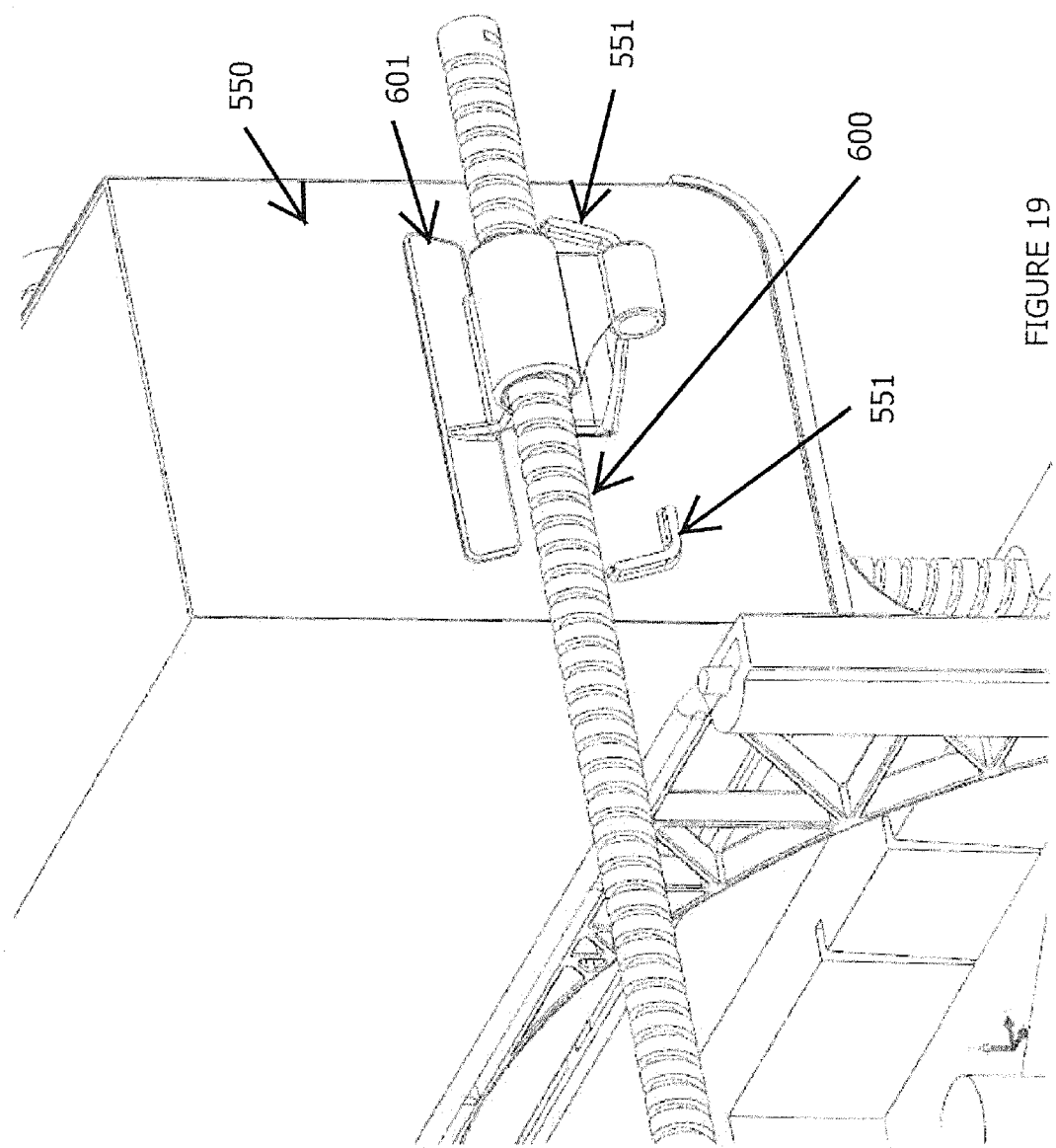
FIGS. 19 and 20 are perspective view of a cat litter return bin and cat litter return bin drive system according to an exemplary embodiment of the present invention.
Figure 20:
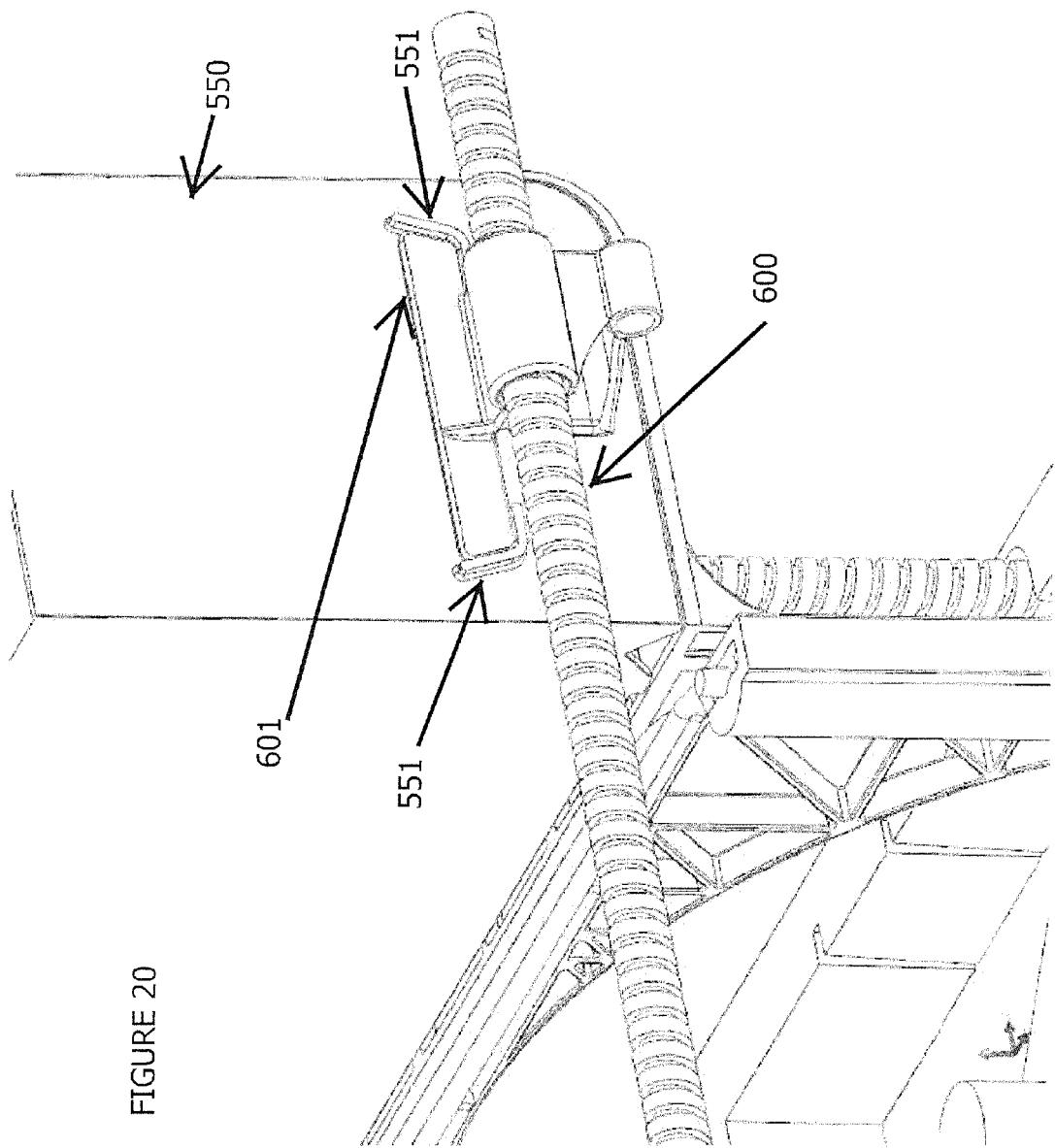

After being filled with cat litter by the hopper 590, the return bin 550 may be automatically moved over the tray 530 by the return bin transport drive mechanism 600. In this regard, as shown in FIGS. 19 and 20, the return bin 550 may include protrusions 551 that catch a corresponding bracket 601 of the return bin transport drive mechanism 600 as the return bin 550 is raised. The catching of the bracket 601 by the protrusions 551 allow the return bin 550 to be driven by the return bin transport drive mechanism 600 back and forth over the tray 530.

Figure 21:
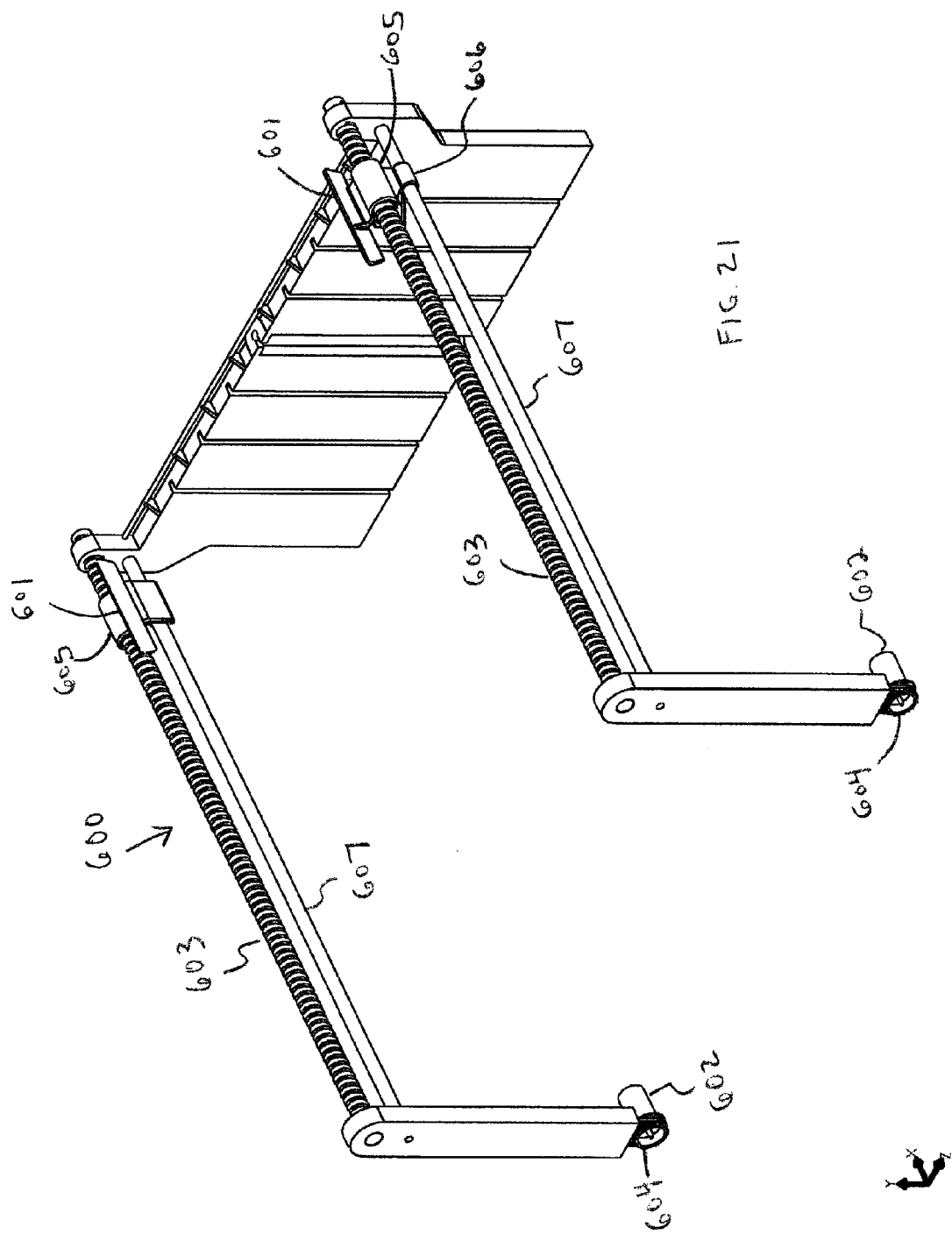
FIG. 21 is a perspective view of a return bin transport drive mechanism according to an exemplary embodiment of the present invention.

FIG. 21 is a perspective view of the return bin transport drive mechanism 600 according to an exemplary embodiment of the present invention. The return bin transport drive mechanism 600 may include motors 602 that cause rotation of corresponding screw drives 603 through drive trains 604, such as, for example, sprocket gears and drive chains. Each of the brackets 601 may include a threaded collar 605 through which pass the screw drives 603 so that rotation of the screw drives 603 cause the brackets 601, and hence the return bin 550 caught on the brackets 601, to move back and forth over the tray 530 depending on the direction of rotation. Each bracket 601 may also include a secondary collar 606 that slides along a corresponding stability bar 607. The stability bars 607 provide stability to the brackets 601 so that they remain in the required position to contact the return bin protrusions 551, and also so that the brackets 601 are prevented from being rotated by the rotational movement of the screw drives 603.

Figure 22:
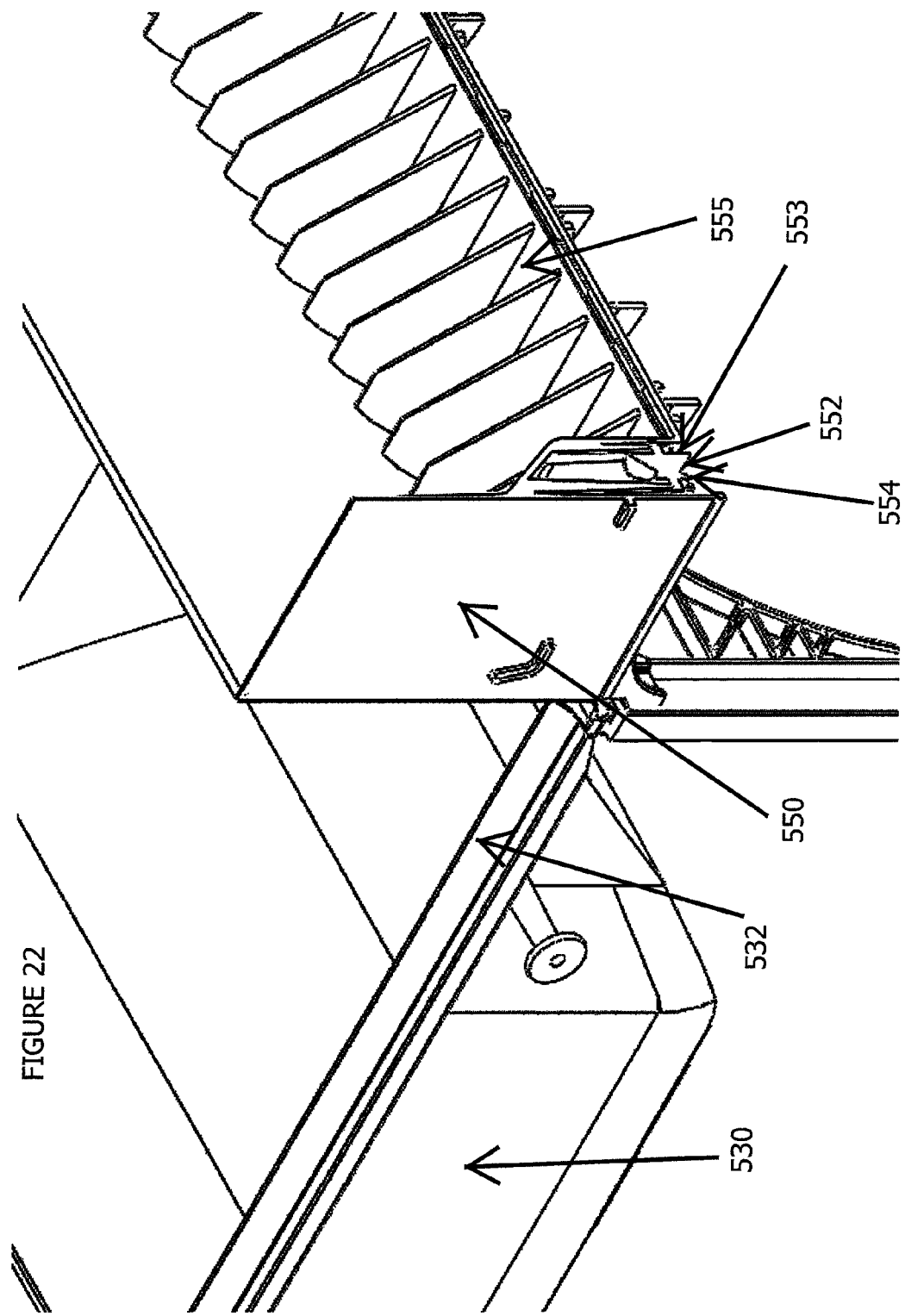
FIG. 22 is a front cross sectional view of a cat litter box showing a return bin on top of the tray according to an exemplary embodiment of the present invention.

FIG. 22 is a front cross sectional view of the cat litter box 500 showing the return bin 550 on top of the tray 530 according to an exemplary embodiment of the present invention. The return bin 550 may include wheels 552 that are exposed through corresponding openings in the bottom wall 555 of the return bin 550. Each wheel 552 may include an inner flange 553 and an outer flange 554. The tray 530 may include a raised rim 532 that protrudes through the openings in the bottom wall 555 of the return bin 550 to interface with the corresponding inner and outer flanges 553, 554 of the wheels 552. In this regard, the rim 532 may have a cross sectional shape, such as, for example, triangular, that protrudes into the space between the inner and outer flanges 553, 554 of the wheels 552. Thus, the rim 532 is able to act as a guide rail for the wheels 552 as the return bin 550 is driven over the tray 530. The rim 532 and wheels 552 also provide additional stability to the return bin 550.

FIGS. 23-25 show the operation of the return bin 550 as it is driven over the tray 530 according to an exemplary embodiment of the present invention. The bottom wall 555 of the return bin 550 may be pivotally attached to the back wall 556 of the return bin 550. Thus, when the return bin 550 is disposed on the elevator frame 561, the bottom wall 555 is held closed. However, as the return bin 550 is driven over the tray 530, the bottom wall 555 becomes free to pivot open, allowing the cat litter held within the return bin 550 to fall into the tray 530. In this regard, the bottom wall 555 may include fins 557 which function to direct the flow of the cat litter evenly over the tray 530. As shown in FIGS. 24 and 25, once fully opened, the bottom wall 555 may plow across the cat litter in the tray 530 so as to keep the cat litter at a constant level. At its furthest point across the tray 530, the bottom wall 555 may form a berm of cat litter at the front of the tray 530. When the tray 530 is later pivoted over the return bin 550, the berm will be the first to fall out of the tray 530, thereby coating any unburied cat waste prior to said waste being dumped into the filter 570. This minimizes sticking of the cat waste to the filter 570, thereby preventing clogs and lengthening the useful life of the filter 570.

FIG. 26 is a partially cut away perspective view of a cat litter box, generally designated by reference number 700, according to an exemplary embodiment of the present invention. The cat litter box 700 has generally the same construction as that of the previous embodiment, except for the added feature of a moveable cover. In this regard, the cat litter box 700 may include a cover 710, a cover drive system 810, a base frame similar to the base frame 520, a cat litter tray 730 similar to the cat litter tray 530, a cat litter tray drive system similar to the cat litter tray drive system 540, a cat litter return bin similar to the cat litter return bin 550, a cat litter return bin drive system similar to the cat litter return bin drive system 560, a cat litter filter 770 similar to the cat litter filter 570, a waste bin 780 similar to the waste bin 580, a hopper similar to the hopper 590, and a cat litter return bin transport drive system 800 similar to the cat litter return bin transport drive system 600.

FIG. 27 is a perspective view of the cover drive system 810 according to an exemplary embodiment of the present invention. The cover drive system 810 may include a motor (not shown) that rotates screw drives 812 through a drive train 814, such as, for example, a drive chain and sprocket gears. The cover drive system 810 may also include a drive wall 816 having threaded collars 818 through which the screw drives 812 pass so that rotation of the screw drives 812 causes the drive wall 816 to move back and forth depending on the direction of rotation.

FIG. 28 is a partially cut away perspective view of the cat litter box 700 in a configuration that appears similar to a conventional covered cat litter box. The cover 710 may include a front cover component 712 and a back cover component 714, with the front cover component 712 being slideable relative to the back cover component 714. In the configuration shown in FIG. 28, the front cover component 712 has been pushed forward and the drive wall 816 has been driven to a position substantially in the back of the cat litter box 700 so that the cat litter box 700 may function as a covered box. In this regard, the cover 710 may include a door 716 attached to the drive wall 816. In the configuration shown in FIG. 28, the door 716 is in an open position to allow a cat to enter the cat litter box 700. The position of the door 716 in the open position also prevents the cat from gaining access to components at the back of the cat litter box 700 so that the cat can not cause damage to the components or injure himself. The front cover component 712 may be locked in the forward position by any suitable locking mechanism 718, such as, for example, one or more clamps.

At the beginning of a cleaning cycle, it is important that a cat within the cat litter box 700 is forced to vacate and that no other cats are allowed to enter so that the cat does not get injured. Thus, as shown in FIG. 27, the cover drive system 810 may be activated at the beginning of a cleaning cycle to push the drive wall 816 towards the front of the cat litter box 700, which in turn moves the door 716 in position to seal the cat litter box 700. The forward movement of the door 716 forces a cat in the cat litter box 700 to vacate and the sealing of the door 716 prevents entry.

If a user chooses to operate the cat litter box 700 as a conventional box without a cover, the user may push the front cover component 712 back into contact with the door 716, as shown in FIG. 26. The front cover component 712 may then be locked to the door 716 by a locking mechanism 720, such as, for example, one or more clamps, so that the front cover component 712 will follow the movement of the drive wall 816. For example, at the beginning of a cleaning cycle the drive wall 816 may be driven forward, which results in sealing of the cat litter box 700 by the front cover component 712 and door 716. At the end of the cleaning cycle, the drive wall 816 may be driven backwards, thereby pulling the door 716 and attached front cover component 712 back into an open configuration.

Now that exemplary embodiments of the present invention have been shown and described in detail, various modifications and improvements thereon will become readily apparent to those skilled in the art.

What is claimed is:

1. An automated cat litter box comprising:
   a cat litter tray;
   a cat litter return bin that collects unsoiled cat litter from the cat litter tray;
   a filter, the filter being moveable between a first configuration in which the filter is positioned over the cat litter return bin to filter out soiled cat litter and a second configuration in which the filter is positioned to dispose of the soiled cat litter;
   a control unit; and
   one or more drive units operated by the control unit to drive the cat litter tray and the cat litter return bin to automatically recycle the unsoiled cat litter during a cat litter box cleaning cycle, wherein the one or more drive units are configured to drive the cat litter return bin between a first configuration in which the cat litter return bin is in position to collect unsoiled cat litter from the cat litter tray and one or more second configurations in which the cat litter return bin is disposed over the cat litter tray to deliver the recycled cat litter to the cat litter tray.

2. The automated cat litter box of claim 1, wherein:
   the one or more drive units automatically pivot the cat litter tray between a first configuration in which the cat litter tray may be used to collect cat waste and a second configuration in which the cat litter tray may be emptied into the cat litter return bin.

3. The automated cat litter box of claim 1, further comprising a hopper, and the one or more drive units move the cat litter return bin between the first configuration the one or more second configurations, and a third configuration in which the cat litter return bin is in position to collect fresh cat litter from the hopper.

4. The automated cat litter box of claim 3, further comprising:
   a waste bin, wherein the filter is disposed within the cat litter return bin when the cat litter return bin is in the first configuration, and the filter is disposed out of the cat litter return bin and in position to dispose of filtered waste to the waste bin when the cat litter return bin is in the third configuration.

5. The automated cat litter box of claim 4, wherein the waste bin comprises a waste bin cover, and the waste bin cover is substantially closed when the cat litter return bin is in the first configuration and the waste bin cover is substantially open when the cat litter return bin is in the third configuration.

6. The automated cat litter box of claim 5, further comprising one or more pivot arms that attach the waste bin cover to the cat litter filter.

7. The automated cat litter box of claim 3, wherein the cat litter return bin comprises one or more wheels that allow the cat litter return bin to move to the one or more second configurations.

8. The automated cat litter box of claim 7, wherein the cat litter tray comprises a raised rim that contacts the wheels so that the cat litter return bin is guided over the cat litter tray when moving to the one or more second configurations.

9. The automated cat litter box of claim 3, wherein the cat litter return bin comprises a bottom wall that is pivotal between one or more open configurations and a closed configuration, and the bottom wall is in the closed configuration when the cat litter return bin is in the first and third configurations, and the bottom wall is in the one or more open configurations when the cat litter return bin is in the one or more second configurations.

10. The automated cat litter box of claim 9, wherein the bottom wall comprises fins that evenly spread the recycled cat litter over the cat litter tray.

11. The automated cat litter box of claim 1, wherein the one or more drive units comprise one or more of the following types of drives: screw drives and chain drives.

12. The automated cat litter box of claim 1, wherein at least one of the one or more drive units comprises a motor.

13. The automated cat litter box of claim 1, wherein one of the one or more drive units comprises a guide rail and wheels that travel within the guide rail, and the one of the one or more drive units drives the cat litter tray.

14. The automated cat litter box of claim 1, further comprising a monitoring system that detects a cat's behavior relative to the cat litter box.

15. The automated cat litter box of claim 1, further comprising a base frame that supports at least one of the cat litter tray, the cat litter return bin and the one or more drive units.

16. The automated cat litter box of claim 1, further comprising a cover that covers at least the cat litter return bin.

17. The automated cat litter box of claim 16, wherein the cover comprises a front cover component and a back cover component, the front cover component being moveable relative to the back cover component between a first configuration in which the cat litter tray is covered by the front cover component and a second configuration in which a substantial portion of the cat litter tray is not covered by the front cover component.

18. The automated cat litter box of claim 17, wherein one or more second drive units automatically move the front cover component between the first and second configurations.

19. The automated cat litter box of claim 16, wherein the cover comprises a door, and one or more third drive units automatically move the door to seal the cat litter box during the cleaning cycle.

20. The automated cat litter box of claim 1, wherein the control system comprises one or more computers that perform one or more of the following functions: networking with other cat litter box computers, collecting and sending data to one or more other computers, and receiving control signals from one or more other computers.

21. An automated cat litter box comprising:
   a cat litter tray;
   a cat litter return bin that collects unsoiled cat litter from the cat litter tray;
   a control unit;
   one or more drive units operated by the control unit to drive the cat litter tray and the cat litter return bin to automatically recycle the unsoiled cat litter during a cat litter box cleaning cycle;
   a hopper, the one or more drive units moving the cat litter return bin between a first configuration in which the cat litter return bin is in position to collect unsoiled cat litter from the cat litter tray, a second configuration in which the cat litter return bin is in position to collect fresh cat litter from the hopper, and one or more third configurations in which the cat litter return bin is disposed over the cat litter tray to deliver recycled cat litter to the cat litter tray;
   a filter; and
   a waste bin, wherein the filter is disposed within the cat litter return bin when the cat litter return bin is in the first configuration, and the filter is disposed out of the cat litter return bin and in position to dispose of filtered waste to the waste bin when the cat litter return bin is in the second configuration.

22. An automated cat litter box comprising:
a cat litter tray;
a cat litter return bin that collects unsoiled cat litter from the cat litter tray;
a control unit;
one or more drive units operated by the control unit to drive the cat litter tray and the cat litter return bin to automatically recycle the unsoiled cat litter during a cat litter box cleaning cycle; and
a hopper, the one or more drive units moving the cat litter return bin between a first configuration in which the cat litter return bin is in position to collect unsoiled cat litter from the cat litter tray, a second configuration in which the cat litter return bin is in position to collect fresh cat litter from the hopper, and one or more third configurations in which the cat litter return bin is disposed over the cat litter tray to deliver recycled cat litter to the cat litter tray;
wherein the cat litter return bin comprises a bottom wall that is pivotal between one or more open configurations and a closed configuration, and the bottom wall is in the closed configuration when the cat litter return bin is in the first and second configurations, and the bottom wall is in the one or more open configurations when the cat litter return bin is in the one or more third configurations.

\* \* \* \* \*